US011999456B1

(12) United States Patent
Smith

(10) Patent No.: US 11,999,456 B1
(45) Date of Patent: Jun. 4, 2024

(54) MAN OVERBOARD RESCUE SYSTEM

(71) Applicant: Shane Michael Smith, Greenbrae, CA (US)

(72) Inventor: Shane Michael Smith, Greenbrae, CA (US)

(73) Assignee: C-Hero, LLC, Greenbrae, CA (US)

( * ) Notice: Subject to any disclaimer, the term of this patent is extended or adjusted under 35 U.S.C. 154(b) by 0 days.

(21) Appl. No.: 18/528,097

(22) Filed: Dec. 4, 2023

Related U.S. Application Data

(63) Continuation-in-part of application No. 17/346,930, filed on Jun. 14, 2021, now Pat. No. 11,834,140.

(51) Int. Cl.
*B63C 9/26* (2006.01)
*B66D 1/04* (2006.01)
*B66D 1/60* (2006.01)

(52) U.S. Cl.
CPC .................. *B63C 9/26* (2013.01); *B66D 1/04* (2013.01); *B66D 1/60* (2013.01)

(58) Field of Classification Search
CPC ................ B63C 9/26; B66D 1/04; B66D 1/60
See application file for complete search history.

(56) References Cited

U.S. PATENT DOCUMENTS 7,648,125 B1 * 1/2010 Huang ..................... B66D 1/22 475/275
8,231,325 B1 * 7/2012 Walton .................. B60P 1/5466 414/543
2009/0189133 A1 * 7/2009 Sharp ...................... B66C 23/36 254/384
2018/0222262 A1 * 8/2018 Vetkos ..................... B60D 1/52

* cited by examiner

*Primary Examiner* — Stephen P Avila
(74) *Attorney, Agent, or Firm* — Steven A. Nielsen; www.NielsenPatents.com

(57) ABSTRACT

A man overboard system may a main body 200 with the main body quickly and easily being attached and detached to a ship's bitt a deck bitt and/or a flat mount system, with the flat mount system attached to a ship, pier or other object. Thus, the system is very portable and may be quickly set up prior to departing and quickly put away at the end of a voyage. The system allows for the fast and efficient rescue of a person overboard without need for a rescuer to enter the water or to risk bodily injury in retrieving a person in the water. The system provides secure mechanical means allowing for a winch to be used in the support of a person which is a significant departure from the prior art.

8 Claims, 39 Drawing Sheets

MAN OVERBOARD RESCUE SYSTEM

CROSS-REFERENCE TO RELATED APPLICATIONS

This utility patent application claims priority of, is a continuation in part (CIP) of, and is based upon U.S. patent application Ser. No. 17/346,930 filed on Jun. 14, 2021, which is a continuation in part, CIP of Ser. No. 16/145,069 filed on Sep. 27, 2018 which claims priority from application 62/564,156 filed on Sep. 27, 2017. This related applications are incorporated herein by reference and made a part of this application. If any conflict arises between the disclosure of the invention in this utility application and those in the related applications, the disclosure in this utility application shall govern. Moreover, the inventor(s) incorporate herein by reference any and all patents, patent applications, and other documents hard copy or electronic, cited or referred to in this application.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION

(1) Field of the Invention

The invention generally relates to water rescue systems. More particularly, the invention relates to means and methods of creating portable lift systems.

(2) Description of the Related Art

The known related art fails to anticipate or disclose the principles of the present invention.

In the related art, general lifts are known, but are dedicated units, affixed to a ship. The prior art lacks means or methods of creating a portable lift system that easily attaches and detaches from the deck of a ship and/or a dock or other stationary object.

Thus, there is a need in the art for the disclosed embodiments.

BRIEF SUMMARY OF THE INVENTION

The present invention overcomes shortfalls in the related art by presenting an unobvious and unique combination and configuration of methods and components to quickly secure a specialized lift system to the deck of a vessel, the bitt of a ship or the bitt of a dock and/or any stationary object. Disclosed embodiments include a plurality of davit or boom sizes and directions of movement to comport with the relevant dimensions of the vessel. Disclosed embodiments include unique vessel and dock attachment systems, davit gate systems and other unique components as further shown in the attached drawings and explained herein.

Disclosed embodiments overcome shortfalls in the related art by the creating and use of a strap and loop system that quickly and efficiently places a rescue strap around a person overboard. The strap and loop system allows a rescue strap to be quickly secured around a loop and allows the loops to be quickly released, once the strap has been placed around the person overboard.

In general, disclosed embodiments may be quickly attached and detached from the deck of a vessel or deck in a ready state, the davit may be secured in vertical position. When needed for a rescue, the davit is quickly lowered by use of a davit gate system or other system. Once the davit is lowered, a hook and loop system allows a rescuer to quickly place the rescue strap around the person to be rescued. The artful combination of the quick release davit gate system and hook and loop system allows for a quick rescue without back strain to the rescuer. The rescuer may stay in a relatively upright standing position when securing the rescue strap around the victim and avoids any lifting by the deployment of the disclosed davit and winch systems integrated into the disclosed embodiments.

The disclosed davit assemblies overcome shortfalls in the related art by having means to be attached to a bitt of a ship in a quick manner. The disclosed davit assemblies may have adjustable feet to comport to different sized bitts. Side stabilizers stop side to side motion.

New efficiencies of operation are achieved by use of thrust bearings within the top and bottom spindle housings. A main body may be comprised of an aluminum channel of rectangular tubing. A worm gear is efficiently disposed near the inside of the main body. Thrust bearings are disposed on either side of a horizontal worm gear. A top winch plate may be of compact format to accommodate a winch. A broad winch plate may also be used as described herein.

In general, some of the disclosed embodiments may be described as follows:

A main body or davit assembly may comprise aluminum tubing that acts as a central point of attachment for many of the related components. Rectangular tubing may be used to accommodate side torque loads. The tubing retains the upper and lower spindle housing mounted to the front, and the vertical spindle runs through the tubing. The bottom of the spindle is where the davit boom connects by a bolt and nylock nut.

The back of the body or davit assembly may have four angle irons, two upper and two lower, that make contact with the bitt. Two or so feet may be used to further stabilize a davit system. Feet and/or angle irons may have adjustments for different sized diameter bitts. On the side of the base there are two positions for the upper strap. The upper strap may have a stainless steel latch clamp with a web adjuster welded to it, to obtain adjustment of a web strap and allow for a tight fit with lower center clamp, the system allowing for quick release by pulling the handle open.

There may be a void in the front of the main body for the worm drive to move if the body torques or twists too much.

Series 3, 5 and 9 Embodiments

Disclosed embodiments also include series 3, 5 and 9 systems that may be either be bit mount of flat mount.

Series 3

A series 3 system may comprise a fixed attachment system, a clutch safety brake to prevent line runaways and to help control the apparatus, and other features.

A series 3 embodiment may include an upper winch plate mount that is fixed or otherwise attached the main body and a winch plate. The use of an fixed upper winch plate mount overcomes shortfalls in the art by using a minimal number of components to secure a davit system to a main body, with the main body attached to a bitt or flat mount.

A series 3 embodiment may sometimes be referred to as a fixed rescue davit. The boom may be raised to the end of a fixed winch plate, and is available in both Bitt Mount and Flat Mount applications, and may either secure to a vessel's bitt (even one side of an H-bitt) or lock into the flat mount's receiving unit, pre installed to a desired location. Thus, making the embodiment suitable for both water and land based applications.

Bitt Mount—Two 2" adjustable straps with latch clamps for tightening around the bitt.

Flat Mount—Anodized aluminum mount with tethered pins to be pre installed to a desired location.

Series 5

Series 5 embodiments may sometimes be referred to as "Fixed Plus" system. Both the boom arm and hinged winch plate may pivot upwardly to bring the Man Over Board, (MOB) closer to safety. Such embodiments may include a clutch safety brake to prevent line runaway problems and to enhance operator control of the rescue. Such embodiments comprise a hinged system for both bitt and flat mount applications. Such embodiments may include a strut or shock to help control the movement of a davit. Such embodiment overcome shortfalls in the related art by having a smaller footprint than other systems that have horizontal pivot systems.

Series 7

Series 7 embodiments may be considered somewhat described in the first 15 or so figures.

Series 9

Series 9 embodiments may be considered or called Human Rated, having a SOLAS safety factor of six times a declared maximum working load of 400 pounds. May comprise a boom arm and hinged winch plate that pivots up or otherwise along a vertical axis to bring a MOB to the front of an operator and within arm's reach of safety. A series 9 embodiment is somewhat similar to a series 5 embodiment. A series 9 embodiment may have a different winch orientation and/or other configurations to increase the rated load.

These and other objects and advantages will be made apparent when considering the following detailed specification when taken in conjunction with the drawings.

REFERENCE NUMERALS IN THE DRAWINGS

Figure 1:
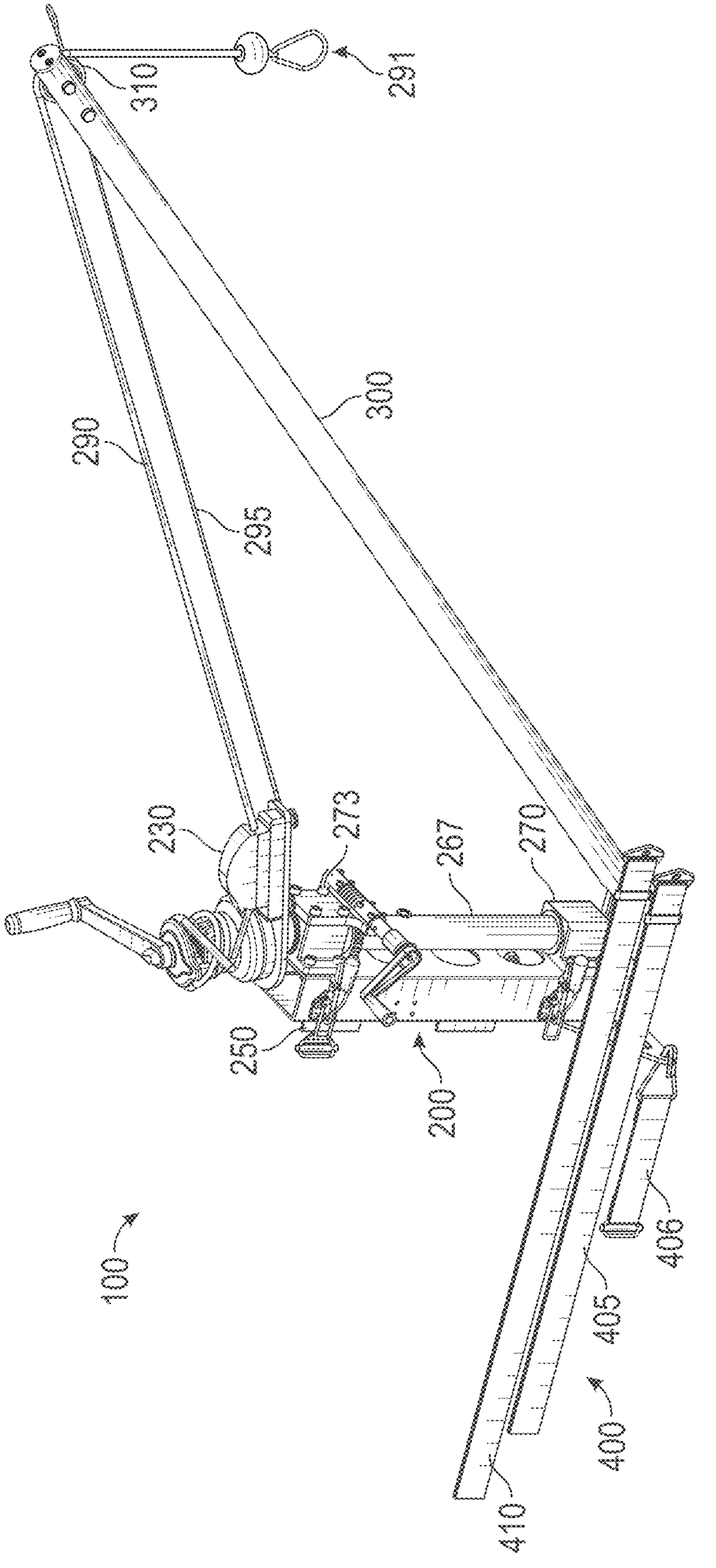
FIG. 1 depicts a disclosed embodiment

100 a disclosed embodiment in general
200 main body
210 tube channel
215 back angle
216 adjustment screw
220 winch
222 winch handle
225 winch plate
226 cleat point/tension button
227 clutch support
230 rope clutch
240 foot
250 latch clamp
252 adjustable slide buckle attached to latch clamp 250

260 worm gear
263 handle for worm gear
265 spindle gear
267 spindle
270 lower spindle block
271 flange sleeve bearing of spindle block
273 upper spindle block
275 spindle connector, or spindle to boom connector
277 boom to spindle connector nut
290 lift line
292 loop to secure lifting strap
295 tension line
300 davit
310 davit sheave
400 latch or strap system
405 lower strap
406 adjustment strap of lower strap 405
410 top strap
413 strap mount
430 latch clamp
500 lower pole assembly
510 reach frame
515 pole adapter
517 distal reach frame member
520 frame bar
522 distal storage void, defined between distal reach frame member
517 and frame bar 520
540 strap
545 strap holder
550 buckle
555 buckle holder
560 strap to rope connector
600 upper pole assemble
610 pole
620 V cleat
630 wire pin
640 lanyard
700 bitt
800 flat mount system or davit flat mount
810 outer surface of flat mount system 800
820 inner surface of flat mount system 800
830 attachment lip of inner surface 820 of flat mount system 800
840 attachment pin of flat mount system
850 lower horizontal foot of flat mount system
860 vertical upper lip of flat mount system
900 lower boom mount or lower davit mount
910 lower boom mount plate
930 lower boom stop plate
940 lower boom receiver plate
MOB man over board
1300 series 3 embodiment
1320 upper winch plate mount-fixed
1322 vertical section of upper winch plate mount-fixed
1324 angled horizontal section of upper winch plate mount-fixed
1326 support bar of upper winch plate mount-fixed
1328 attachment void for support bar 1326 defined by upper winch pate mount
1350 broad winch plate
1360 lower guard of broad winch plate
1370 lower cleat of broad winch plate
1500 series 5 embodiment
1510 hinge plate
1520 hinge of hinge plate 1510
1530 lower shock mount
1540 shock or strut
1560 rectangular winch plate
1565 distal end of rectangular winch plate
1570 crescent void defined within distal end of rectangular winch plate
1580 struct bracket of rectangular winch plate
1582 attachment void defined within struct bracket 1580
1590 winch plate strut mount
1600 side bracket for hinge plate to main body 200 attachment
1610 wing fasteners for further attachment of hinge plate to main body
1900 series 7 embodiment
2000 series 9 embodiment

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words “comprise,” “comprising” and the like are to be construed in an inclusive sense as opposed to an exclusive or exhaustive sense; that is to say, in a sense of “including, but not limited to.” Words using the singular or plural number also include the plural or singular number, respectively. Additionally, the words “herein,” “above,” “below,” and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Any and all the above references and U.S. patents and applications are incorporated herein by reference. Aspects of the invention can be modified, if necessary, to employ the systems, functions and concepts of the various patents and applications described above to provide yet further embodiments of the invention.

Figure 2:
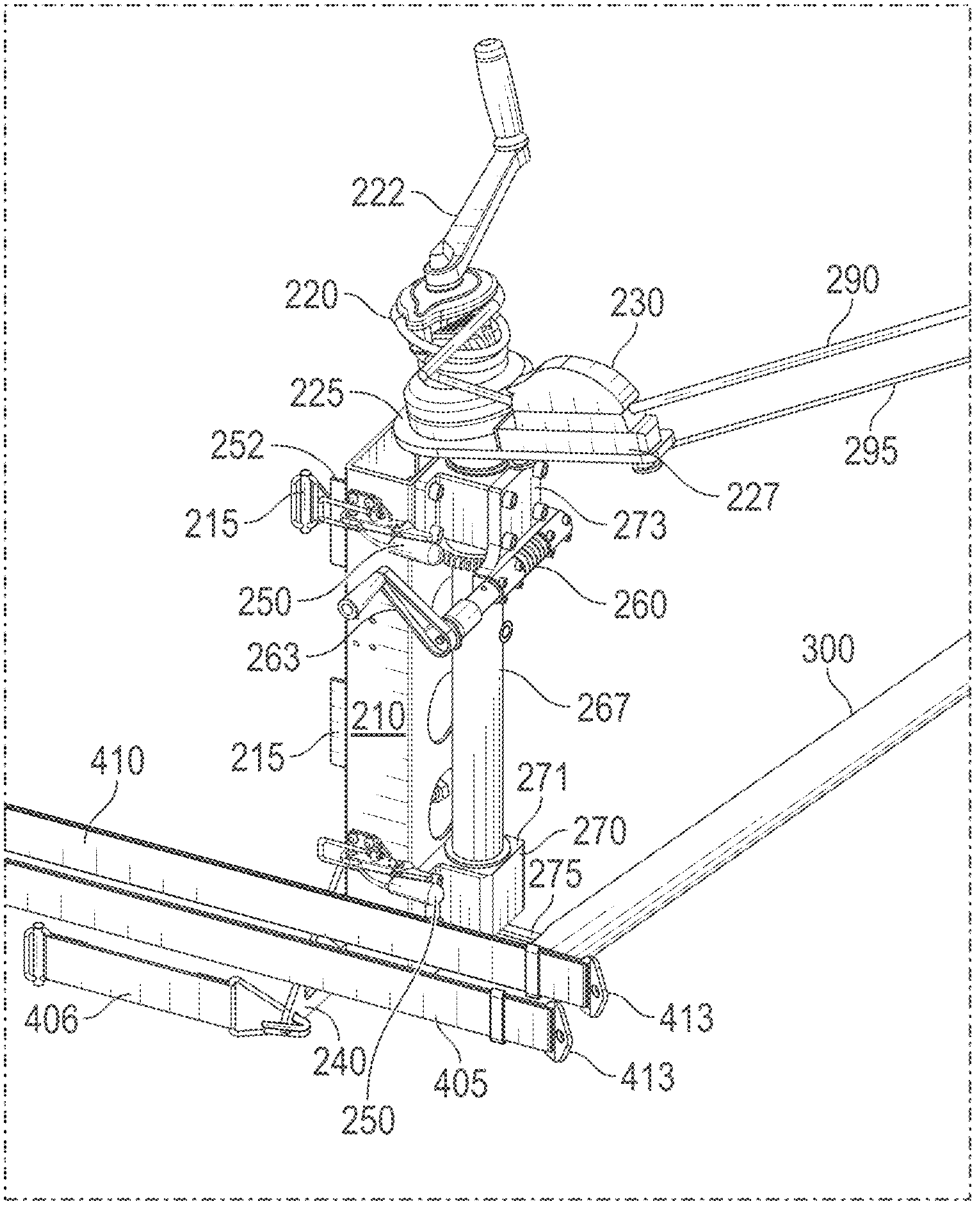
FIG. 2 depicts a disclosed embodiment

FIG. 1 depicts a disclosed embodiment 100 in general which may comprise a main body 200 having a tension line 295 that supports a davit 300 to boom assembly with the davit moved laterally by use of a worm gear 260 (See FIG. 2). While the davit may be moved laterally, a lift line 290 may be lowered or raised, with the lift line connected to a rescue strap or other system which may secure a person in the water in need of rescue.

A main body 200 may be secured to a ship bitt by use of a latch or strap system 400, the strap system may comprise a plurality of straps 410 with the straps reaching around a bitt and the straps secured to the main body by a plurality of latch lamps 250 with the latch clamps having an over centered pivot point and or an over center lock position.

A boom or davit 300 may comprise rotational means of supporting a lift line 290 and or may ride upon or pivot about a davit sheave 310 or pivot wheel.

Referring to FIG. 2 a winch 220 may pull or control a lift line 290, with the winch attached to a rotating winch plate 225. The use of the winch plate 225 and attached spindle 267 and the artful and secure manner of attachment of the main body to a bitt and the artful and secure manner of the spindle 267 disposed between two spindle blocks 273 and 270 overcome shortfalls in the related art by, inter alia, providing the only means in the market place for a winch to be rated or approved for the support and/or transport of a human being. In the related art, a winch without further means of safety or support, is not rated for the movement of a human being. The presently disclosed embodiments have achieved unexpectedly excellent results in obtaining approval from a winch manufacturer to allow or approve of said winches to be used with the disclosed embodiments for use in human transport or human support.

The safety of the disclosed embodiments is achieved, inter alia, by use of a rectangular main body 210, the main body having four vertical members and the main body securing or secured to two an upper spindle block 273 and a lower spindle block 275 with a spindle 267 disposed between the two spindle blocks and with the spindle in rotational attachment within the two spindle blocks. The spindle may be attached to a winch plate 225 and a spindle to boom connector 275 such that the lift line 290 and boom 300 may move laterally in unison to increase product utility and safety. The spindle 267 may be rotated by use of a worm gear 260 in geared attachment to a spindle gear 265 with the spindle gear having an inner circumference fixedly attached to spindle 267. The worm gear may be rotated by use of a handle 263.

The efficacy and safety of the disclosed embodiments is also increased by the artful use of feet 240 with each foot defining a plurality of voids, the voids configured to retain one or more straps 410 with the straps being secured around a ship bitt and the straps further secured to the main body by the disclosed latch clamps 250.

Added product utility and efficiency is also achieved by use of a plurality of back angles 215, the back angles providing an needed offset between the main body 200 and a ship's bitt.

Figure 3:
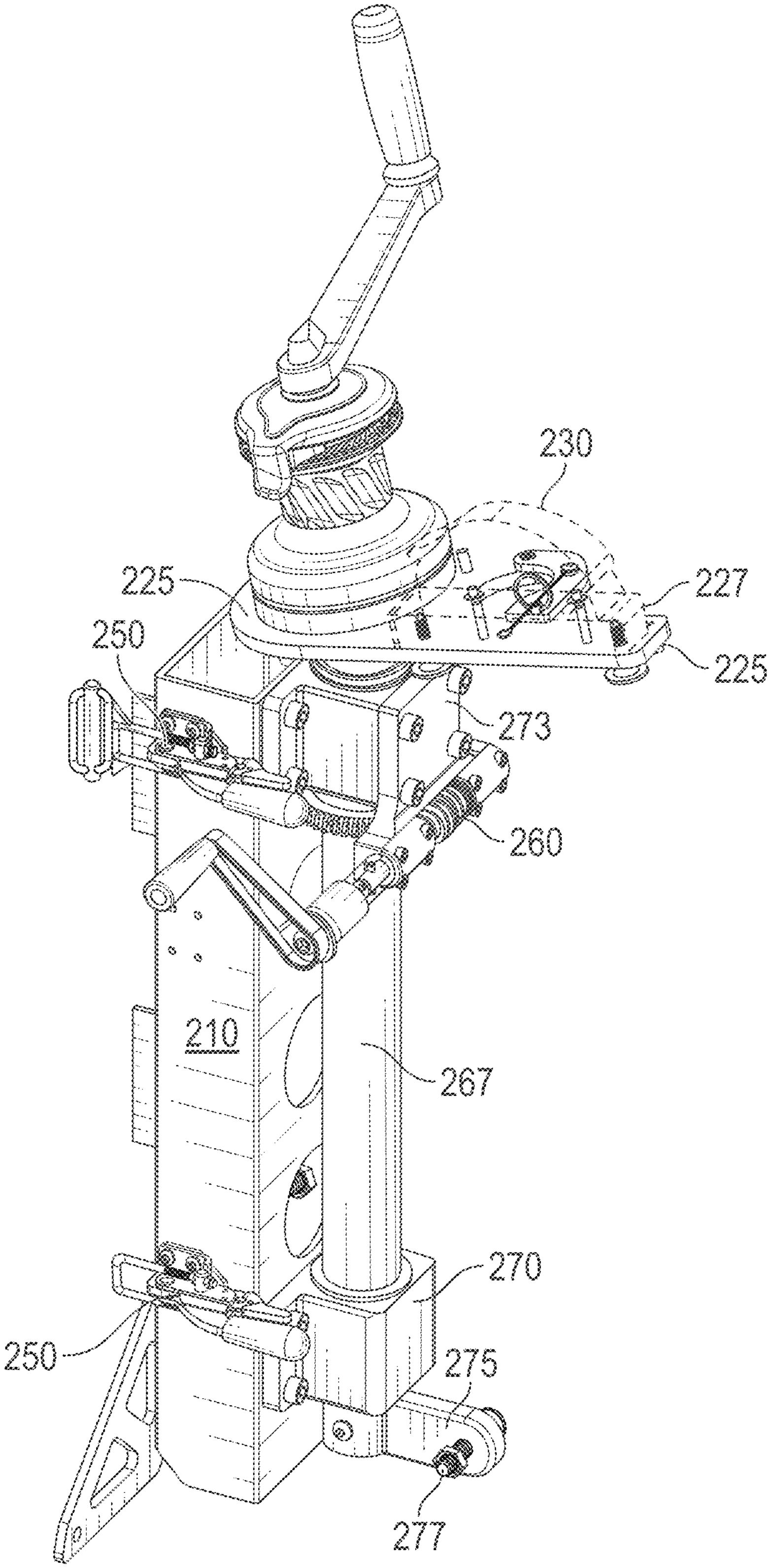
FIG. 3 depicts a main body

Referring to FIG. 3, the disclosed embodiments overcome shortfalls in the related art by providing means and methods for an artfully placed and artfully shaped winch plate 225 such that the winch plate allows for horizontal or near horizontal rotation in unison with the boom and the winch plate enables a clutch support 227 to support a rope clutch 230 with the rope clutch being adjacent to the winch. The winch plate overcomes shortfalls in the art by keeping the winch near the rope clutch while keeping the lift line in the same plane as the boom or davit.

To further keep the lift line, wench and davit in the same plane, FIG. 3 depicts a spindle connector 275 attached to the spindle 267 with the spindle connector 275 having a boom or davit to spindle connector nut 277.

Figure 4:
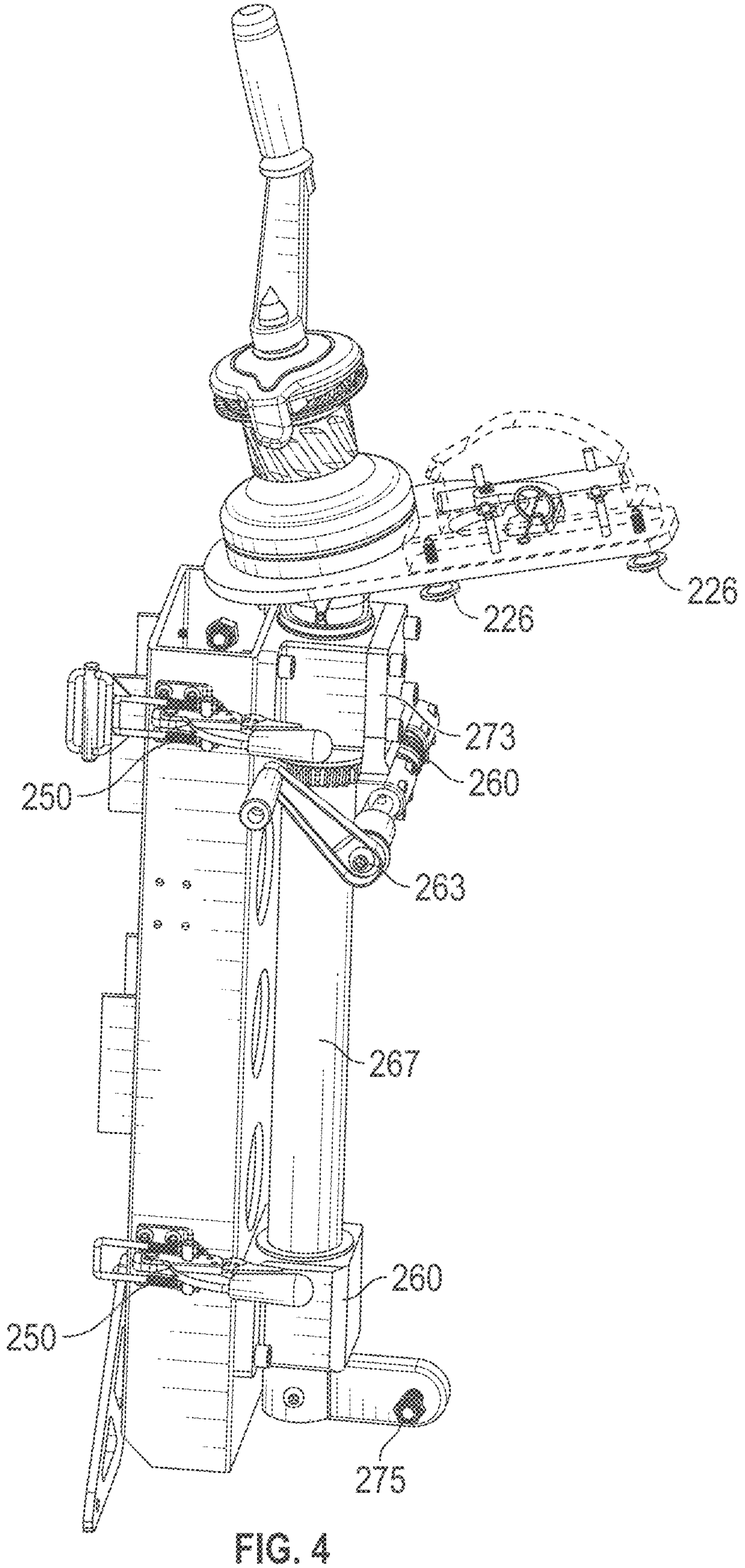
FIG. 4 depicts a main body

FIG. 4 highlights the positioning of the two latch clamps 250 as well as the spindle system used to keep the davit and lift line aligned. The synchronized horizontal movement of the lift line and davit overcomes shortfalls in the art as the lift line can be moved horizontally by mechanical means, allowing a rescuer to stay on board the ship and out of the water.

Figure 5:
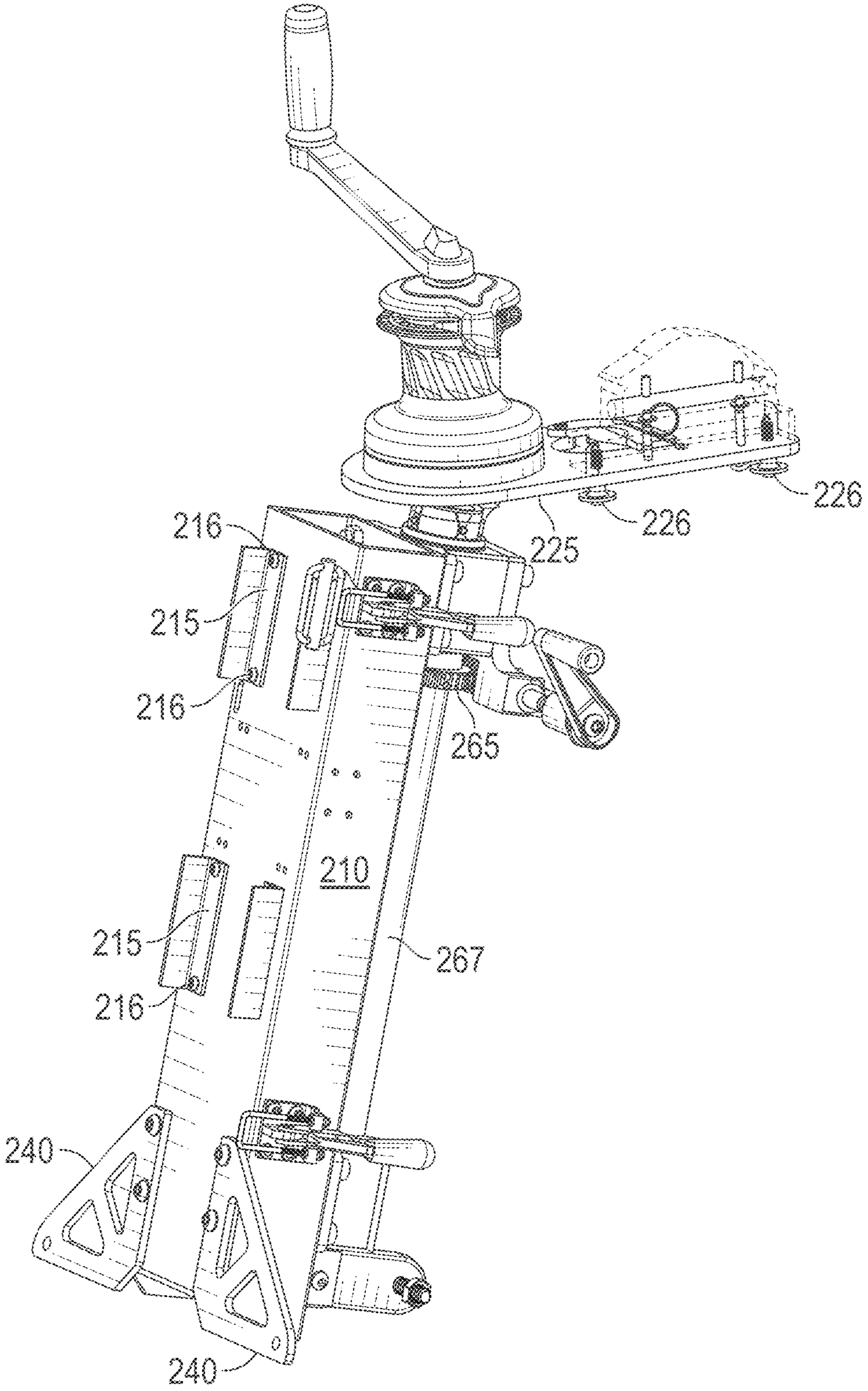
FIG. 5 depicts a main body

FIG. 5 depicts feet 240 used to keep the main body from twisting or otherwise coming out of position due to the forces exerted upon the davit and/or lift line.

Figure 6:
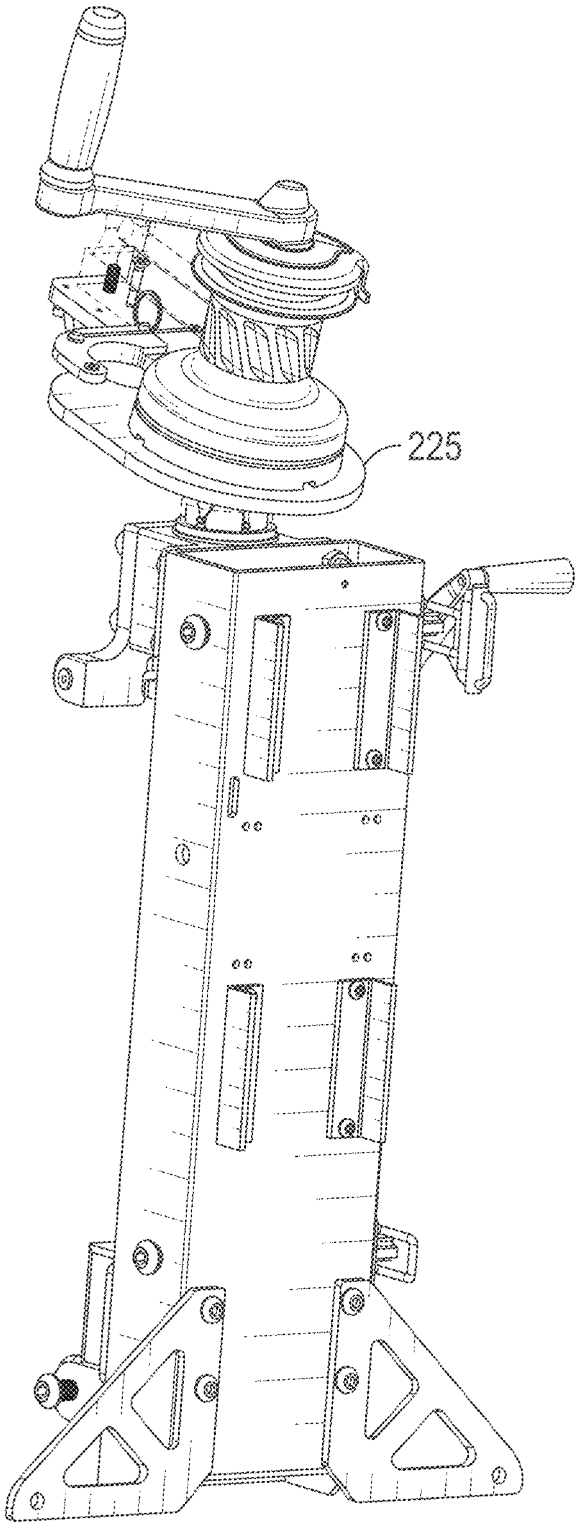
FIG. 6 depicts a main body

FIG. 6 depicts the artful position of the winch plate 225.

Figure 7:
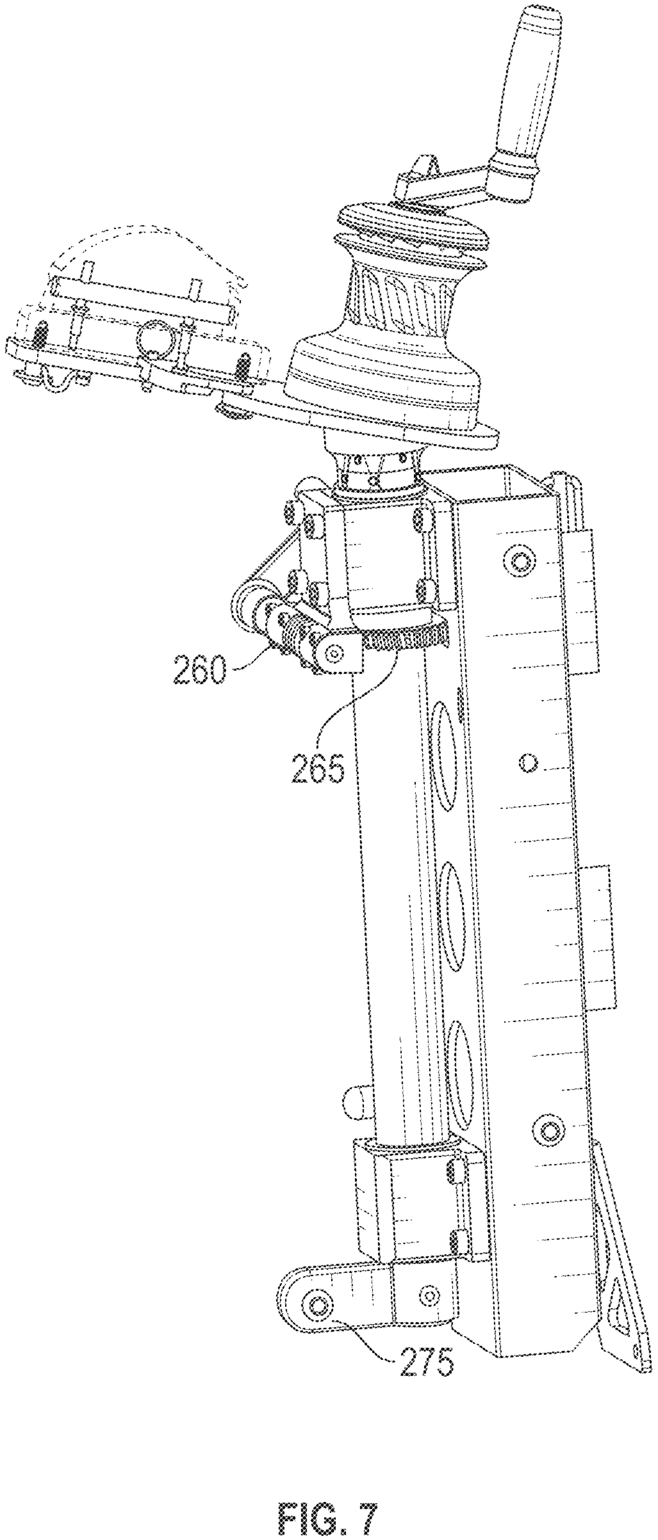
FIG. 7 depicts a main body

FIG. 7 depicts geared relationship between the worm gear 260 and the spindle gear 265.

Figure 8:
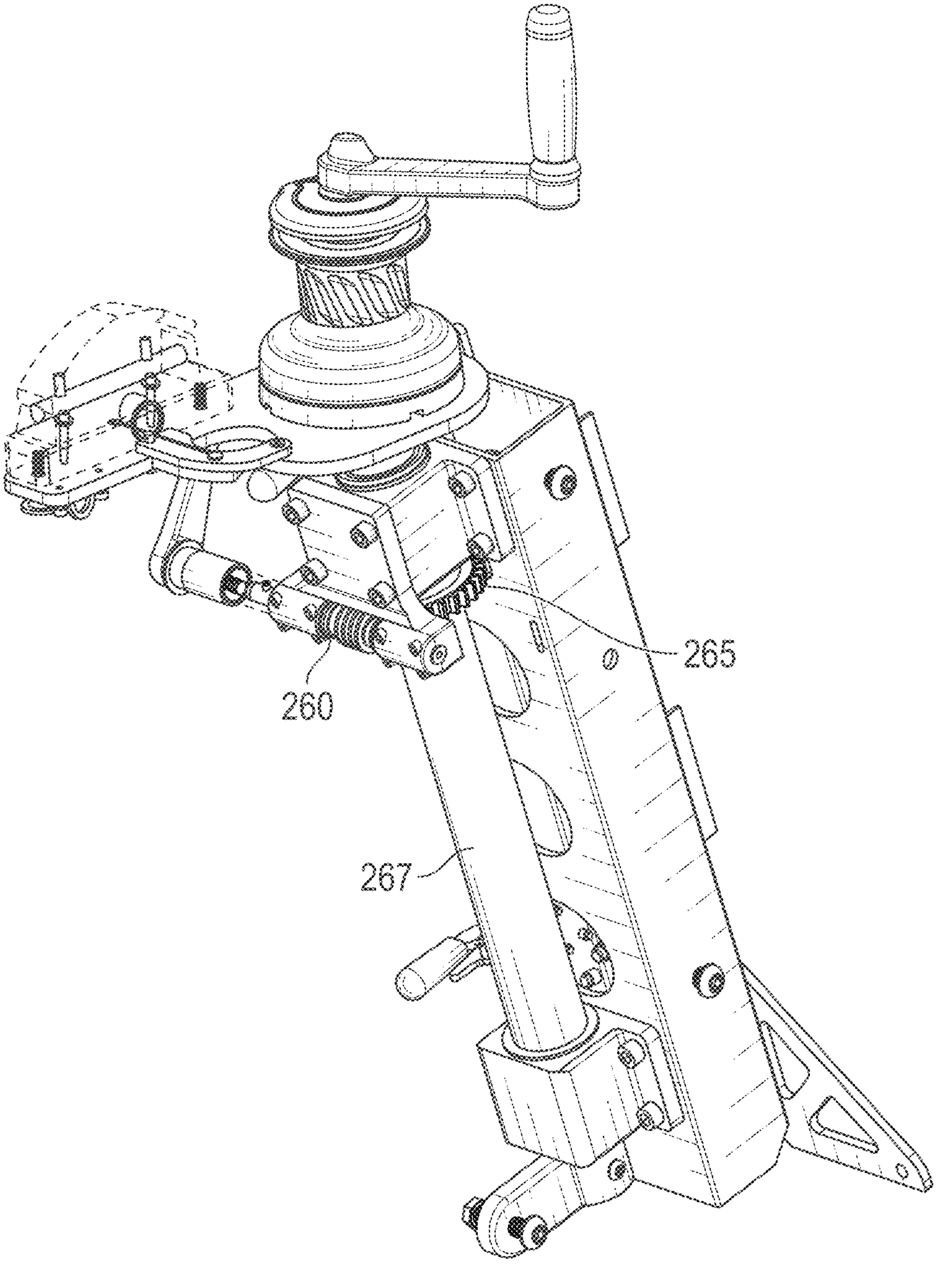
FIG. 8 depicts a main body

FIG. 8 depicts an altered angle from FIG. 7.

Figure 9:
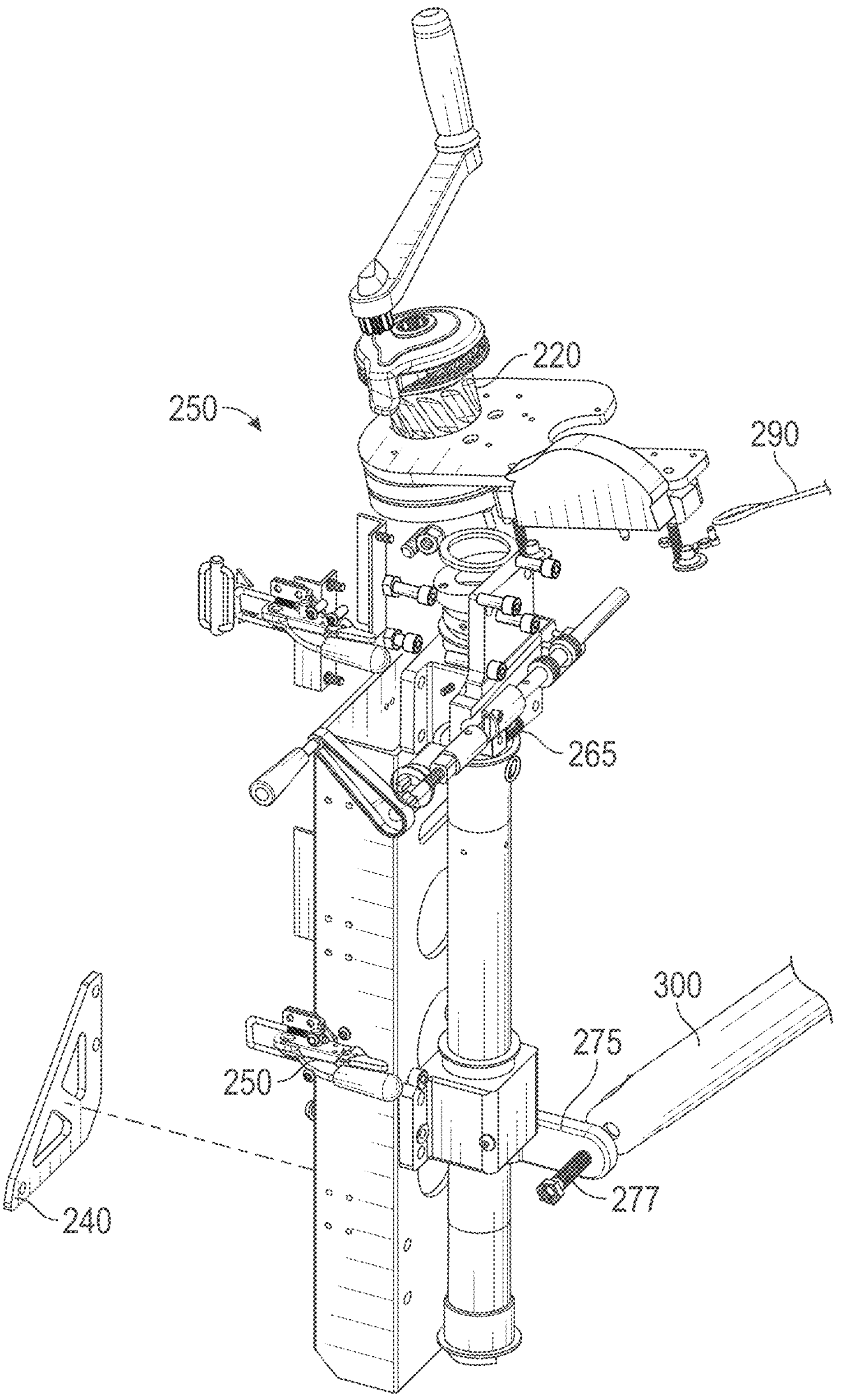
FIG. 9 depicts an exploded view of a main body

FIG. 9 depicts an exploded view of a main body. The lift line 295 is shown removed from the winch.

Figure 10:
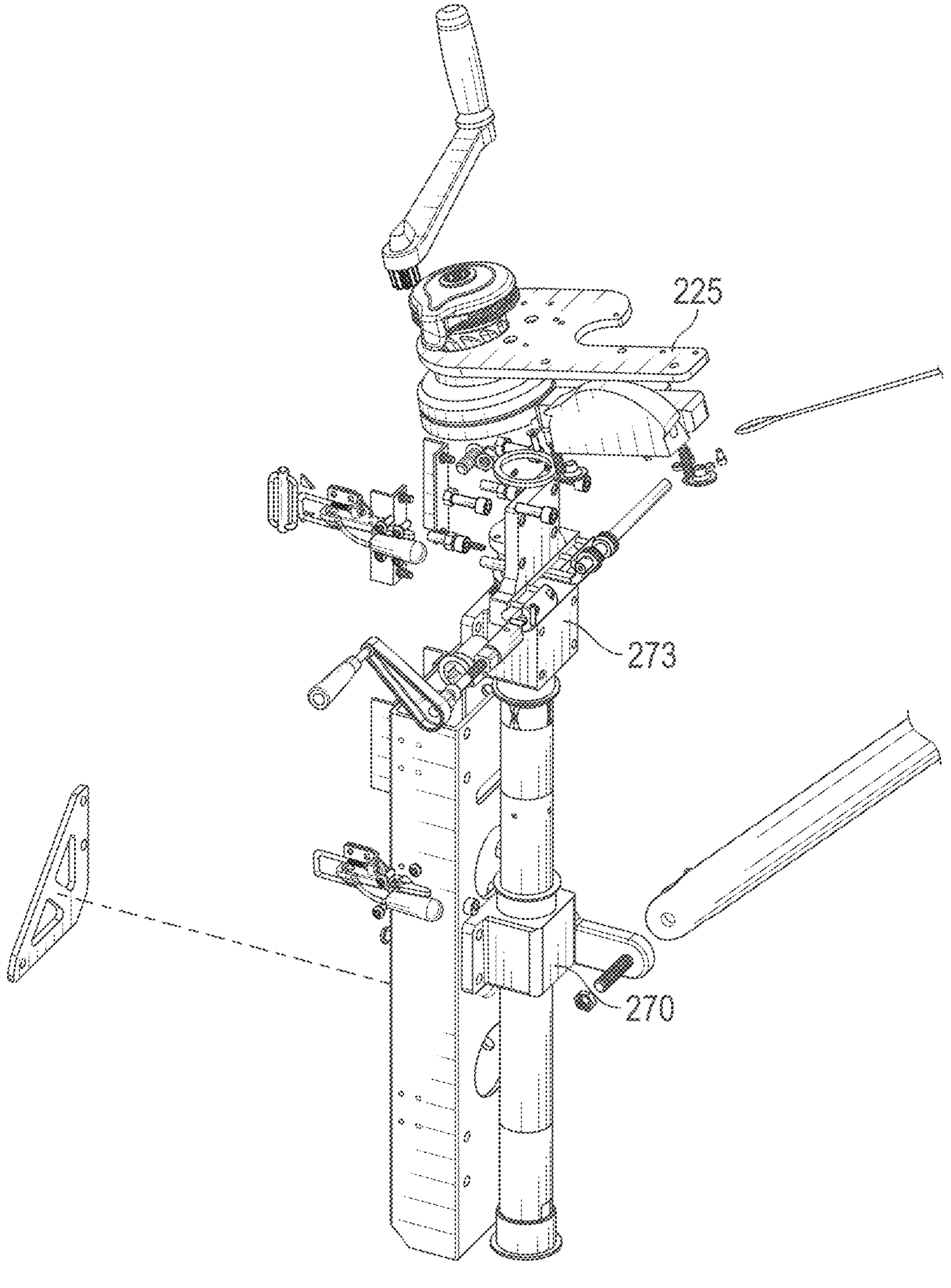
FIG. 10 depicts an exploded view of a main body

FIG. 10 depicts an exploded view of a main body. The relationship between the lower spindle block 275 and upper spindle block 273 are shown.

Figure 11:
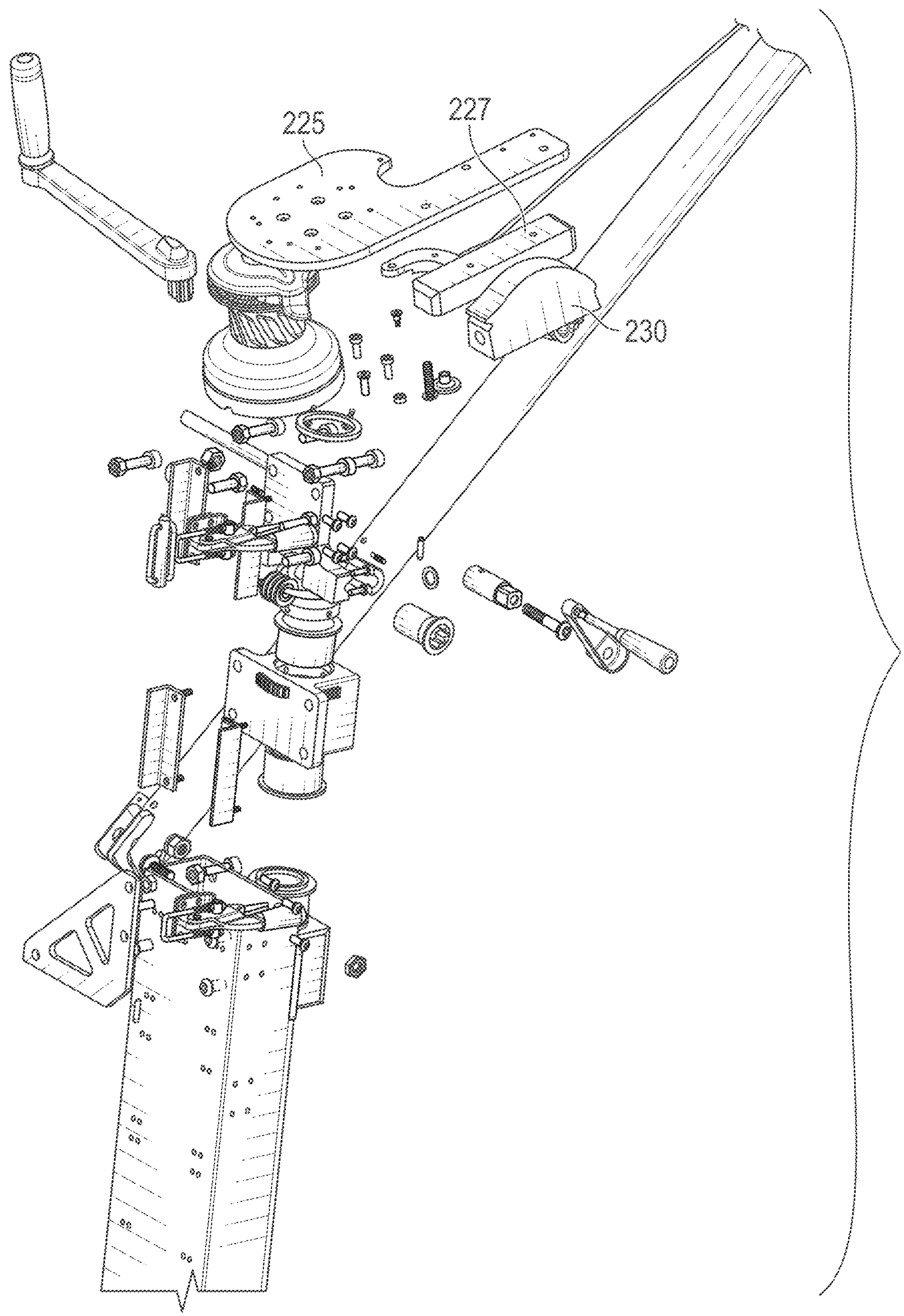
FIG. 11 depicts an exploded view of a main body

FIG. 11 depicts the shapes of the winch plate 225, clutch support 227 and rope clutch 230 and related components.

Figure 12:
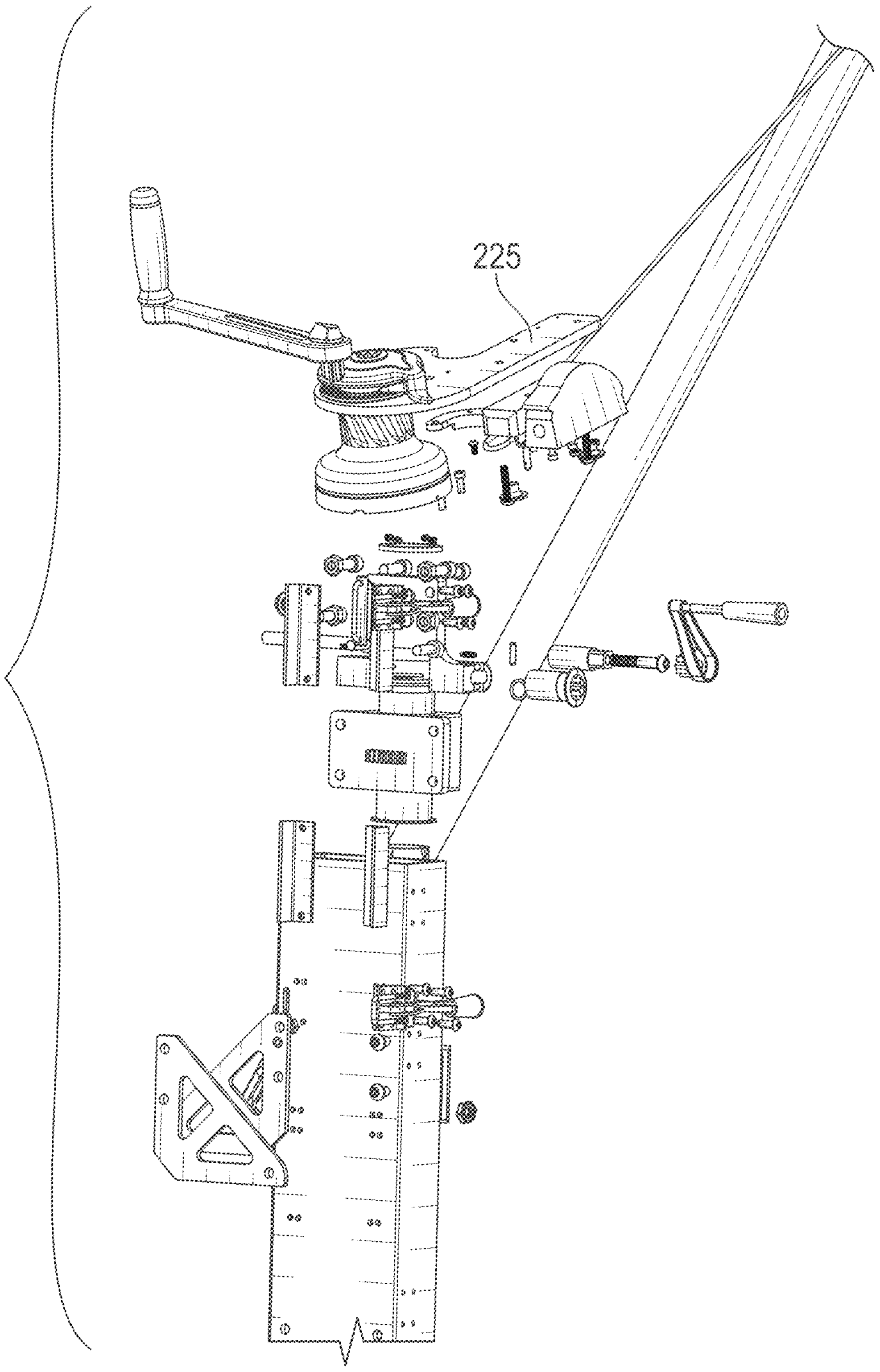
FIG. 12 depicts an exploded view of a main body

FIG. 12 depicts an altered angle from FIG. 11.

Figure 13:
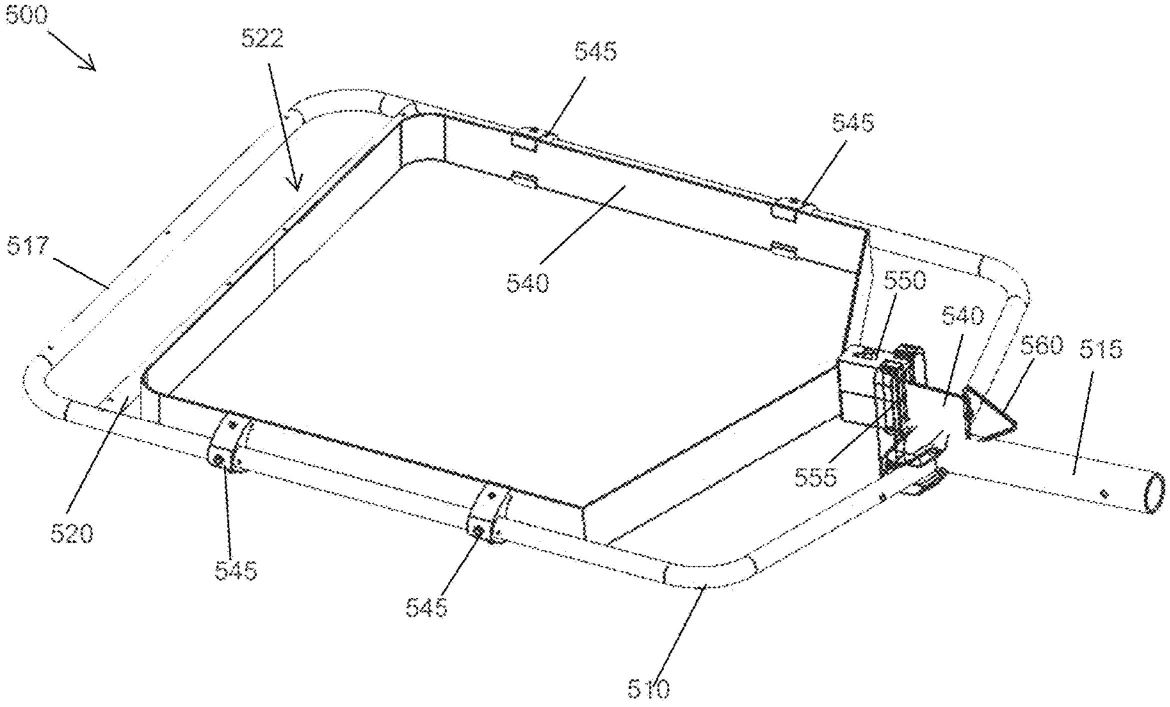
FIG. 13 depicts a lower pole system

FIG. 13 depicts a lower pole assembly 500 sometimes used to secure a lifting strap to a person in need of rescue. A lower pole assembly may comprise a reach frame 510, with the reach frame having a distal reach frame member 517. A distal reach frame member 517 and a frame bar 520 may define a distal storage void 522, with the distal storage void sometimes used to store webbing, rope or other means of securing a person in the water.

A lower pole assembly 500 may include means of securing a strap 540 within the perimeter of the reach frame and frame bar 520 by use of a plurality of strap holders 545.

The strap 540 may be secured by use of a buckle 550, with the buckle retained in a buckle holder 555.

Figure 14:
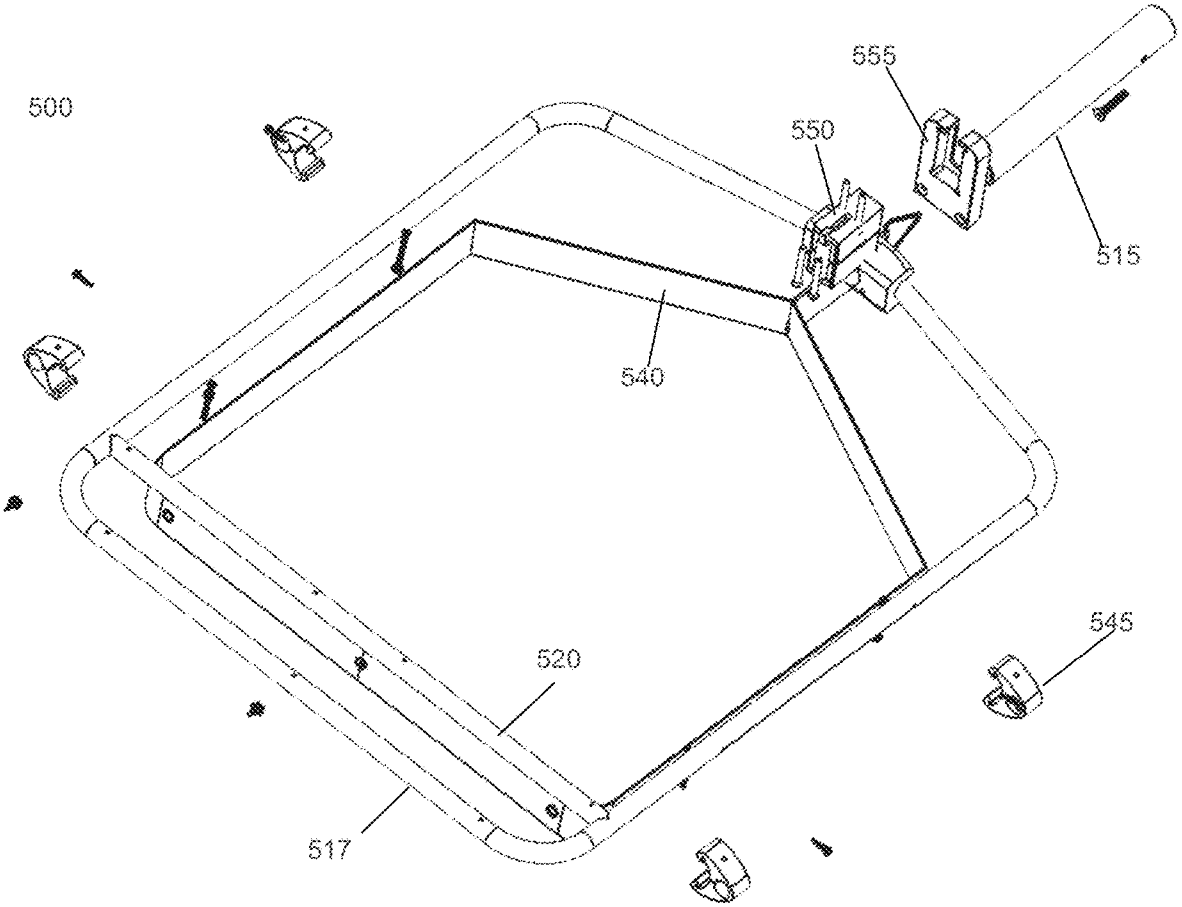
FIG. 14 depicts an exploded view of a lower pole system

FIG. 14 depicts the components of FIG. 13 in an exploded view.

Figure 15:
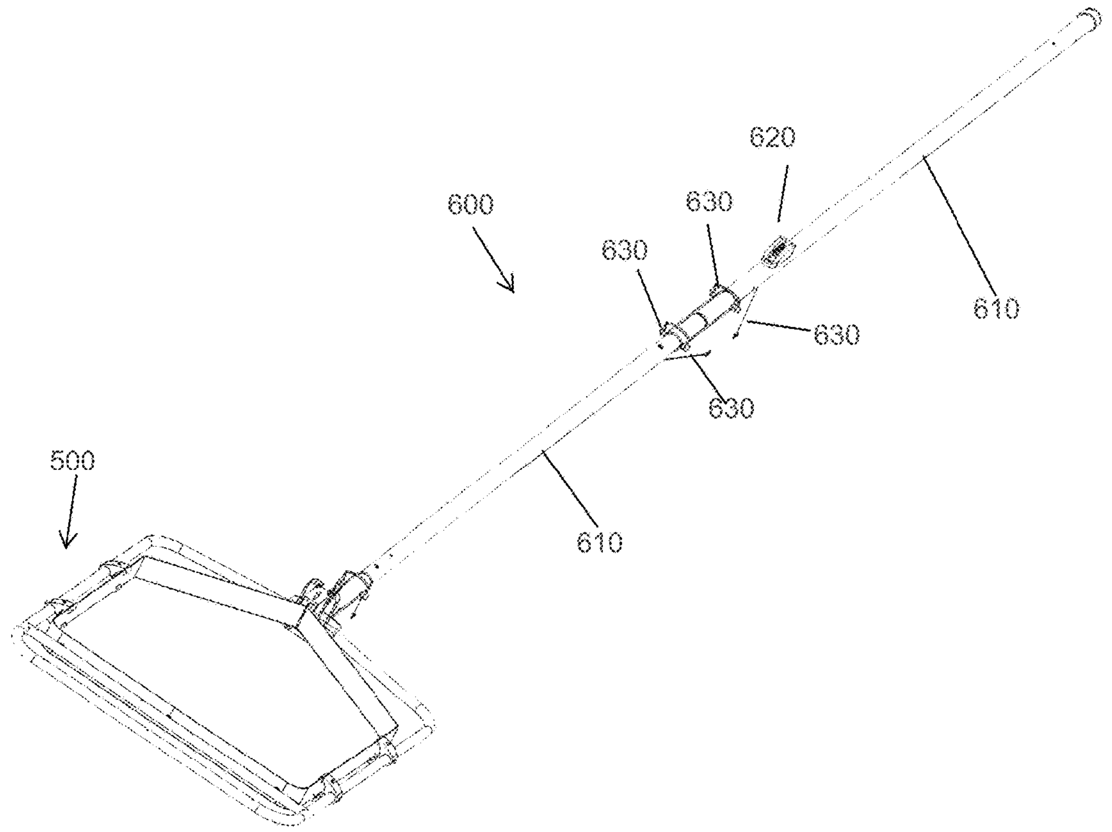
FIG. 15 depicts a lower pole attached to an upper pole

FIG. 15 depicts a lower pole assembly 500 in attachment to an upper pole assembly 600.

A distal end of the lift line may be attached to a ball or other stopping element. A stopping element may be defined as any object attached to the lift line that will not pass through the davit sheave. A stopping element or ball attached to a distal end of the lift line will cause the davit to rise when the lift line if fully retracted. Thus, the tension line will sag, allowing the davit to be raised to a higher level, giving a rescue worker more room to maneuver a swimmer on to the deck of the ship. Such a feature helps to compensate for ship biffs that are disposed at an angle upon a ship deck.

At a yet more distal position on a lift line, a loop may be attached, just behind a ball or stopping element. The loop may be attached to strap to rope connector 560.

Referring to FIGS. 13 and 14, after a person over board is placed within the loop, the handle or upper pole may be pressed toward the person, causing the one way bracket or bracket holder to chinch the strap 540 around the person. The strap holders may then disengage, causing the strap to be freed from the pole and hoop system. Thus, the person may then be retrieved from the water. In some instances, the hoop and pole system may not break free from the strap, and the pole may be simply retained as the person is hoisted back into the boat.

The disclosed embodiments are well suited for use anywhere water is present and are useful at docks and poolside.

Figure 16:
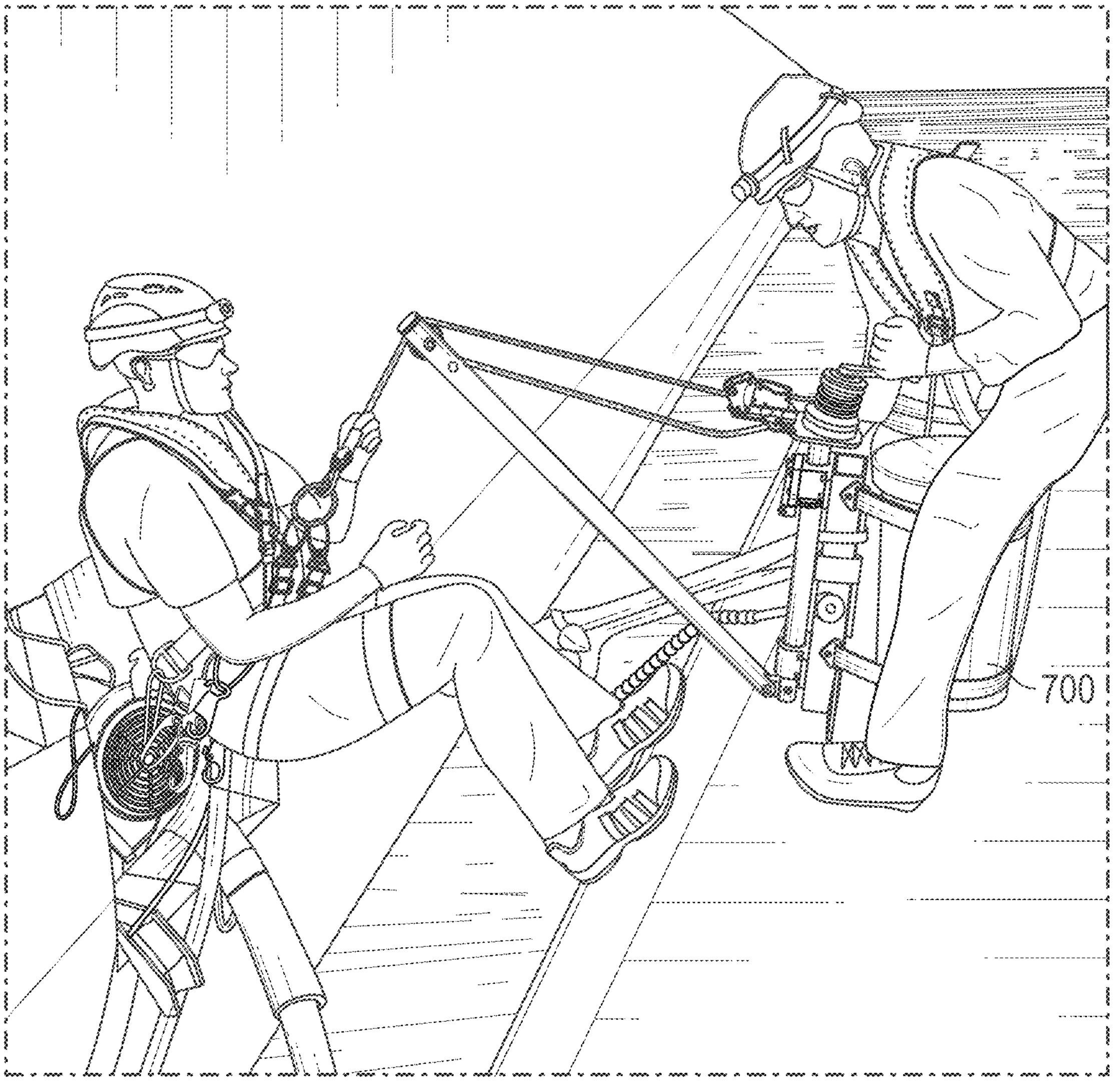
FIG. 16 depicts a disclosed embodiment attached to a bitt with the bitt attached to a dock
Figure 17:
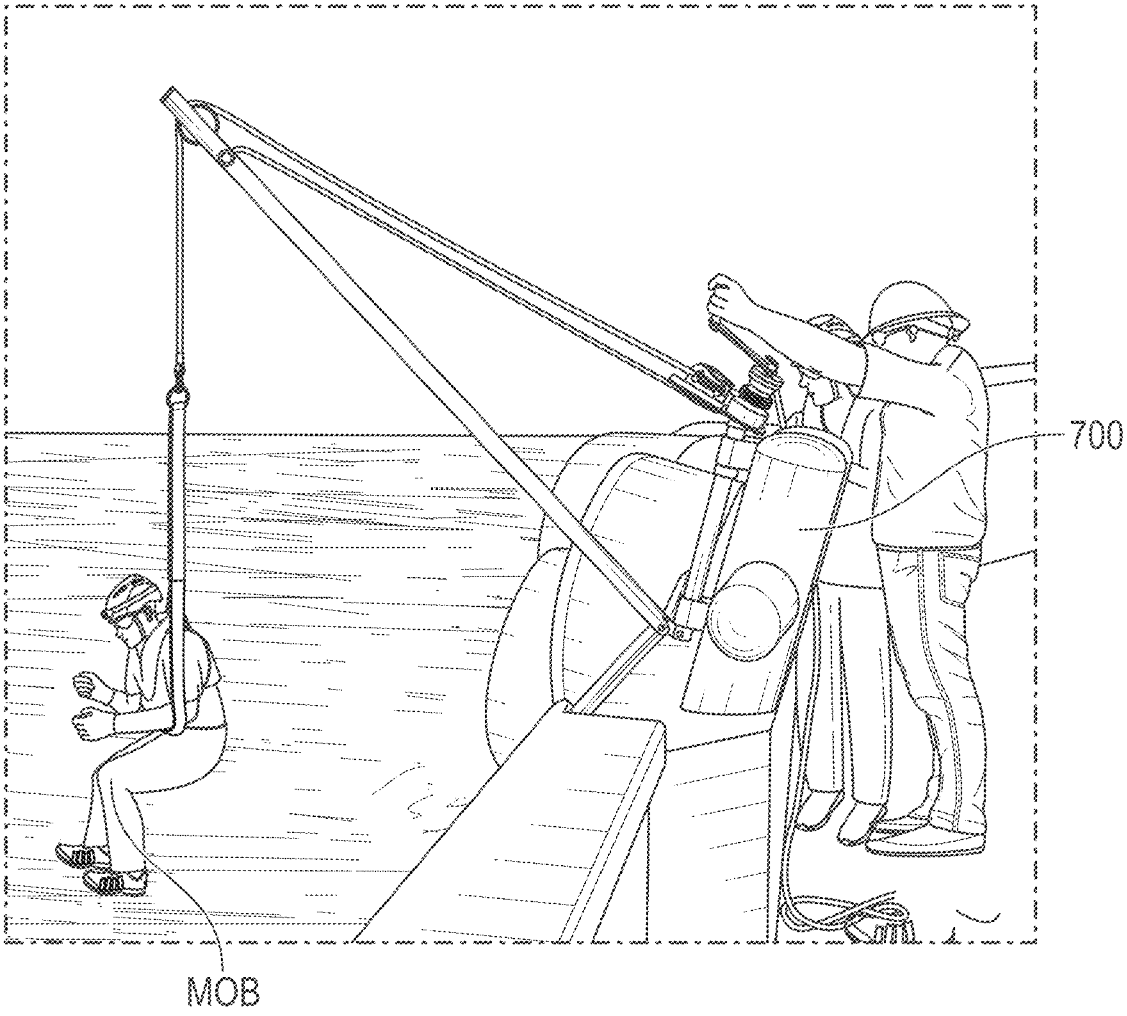
FIG. 17 depicts a disclosed embodiment attached to a bitt with the bitt attached to a ship

FIG. 16 and FIG. 17 depict disclosed embodiments attached to bitts 700. Bitts are often found on ships or on docks. Disclosed embodiments overcome shortfalls in the art by being well suited for attachment to bitts.

In one disclosed embodiment, cleat points 226 may be used to adjust the length of the tension line 295 such that angled bitts can be used to secure the system. Angle pieces 216 provide points of contact with round bitts so as to prevent direct contact with the main body 200. The angle pieces are secured by adjustment screws 216, allowing the angle pieces to be secured in a myriad of configurations to comport with a myriad of bitts that might be encountered at dock. The strap system 400 is more partially defined and is used to secure the system to a bitt, wherein the bitt may be angled.

The prior art of Perri and Wesson teaches away from the use of bits or other angled pieces and instead teaches the use of holes and pins to anchor a boom system.

The disclosed embodiments include:

A man over board rescue system comprising:

- a main body (200), the main body comprising a tube channel (210) the tube channel attached to an upper spindle block (273) and an lower spindle block (275) with a spindle (267) disposed between the upper spindle block and the lower spindle block; the spindle attached to a spindle gear (265) with the spindle gear in geared attachment to a worm gear (260) with the worm gear attached to a handle (263); the spindle having a top end attached to a winch plate (225) with the winch plate attached to a winch (220) and the winch plate supporting a rope clutch 230; the spindle having a lower end attached to a spindle connector (275), the winch plate (225) comprising a lower side, with the lower side comprising a pair of cleat points (226), the cleat points used to adjust the length of a tension line (295) so as to allow the main body (200) to comport with angled bits;
- a lift line (290) attached to the winch and the lift line in contact with a distal end of a davit (300); and
- a proximal end of the davit attached to the spindle connector;
- the tube channel (210) further comprising a plurality of back angle pieces (215) attached to the tube channel by use of adjustment screws (216), the attachment screws, attached within voids defined by the tube channel, the back angle pieces used as contact points upon a round bitt;
- the main body further comprising a plurality of latch clamps (250) attached to the tube channel (210) the latch clamps in frictional attachment to a strap system (400) the strap system comprising a top strap (410) and a lower strap (405) with the lower strap in frictional attachment to an adjustment strap (405); the strap assembly used to attach the main body (200) to a bitt The main body further comprising a plurality of feet (240) attached to a lower end of the tube channel (210) the feet stabilizing the main body even when attached to an angled bitt.

FIG. 16 shows an embodiment strapped to a bitt, with the bitt being on a dock. Any of the disclosed embodiments may be attached to a bitt by use of the disclosed straps and other features.

FIG. 17 shows an embodiment strapped to a bitt, with the bitt being on a ship. Any of the disclosed embodiments may be attached to a bitt by use of the disclosed straps and other features.

Figure 18:
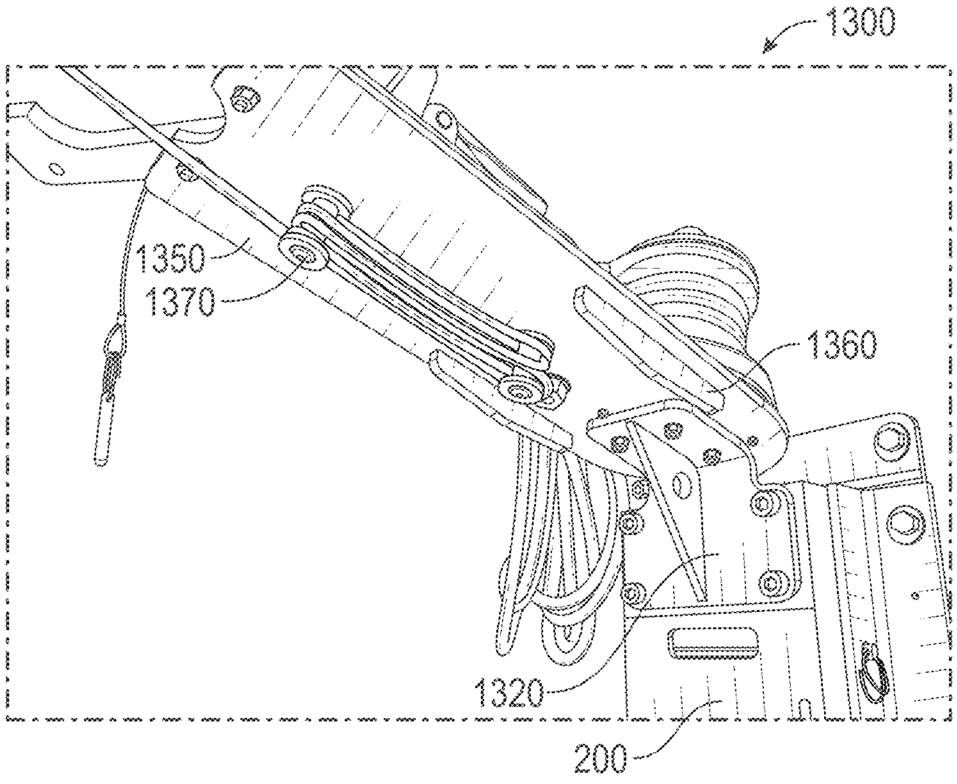
FIG. 18 is a lower front perspective view of a series 3 embodiment
Figure 19:
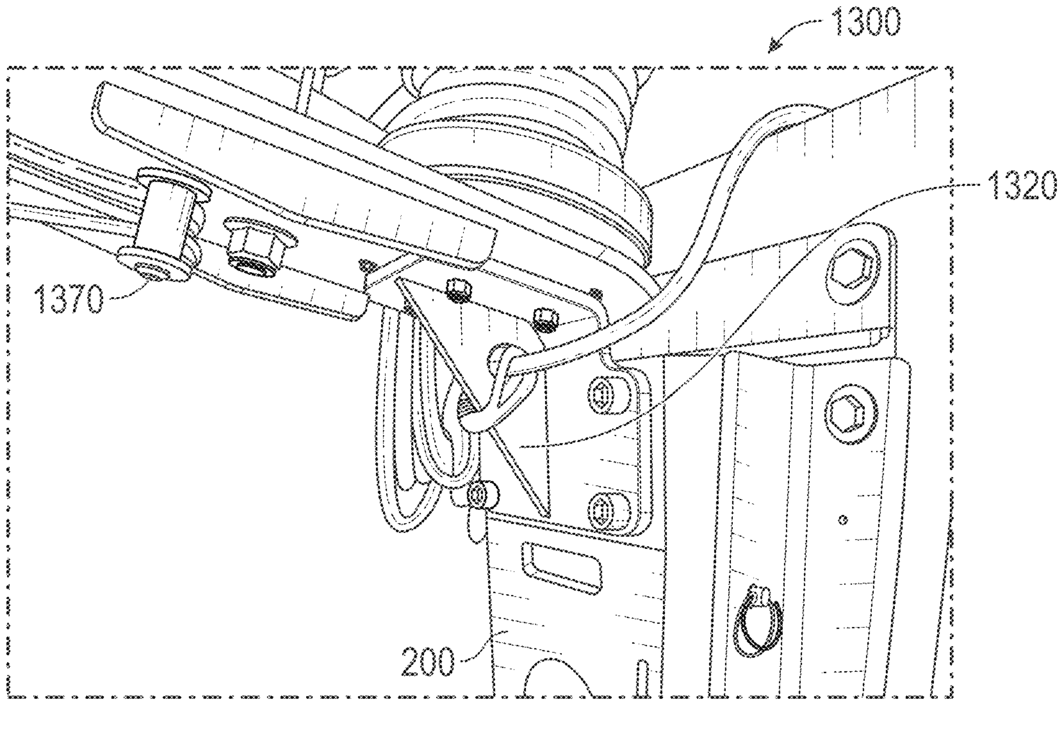
FIG. 19 is an expanded lower front perspective view of a series 3 embodiment

FIG. 18 depicts a series 3 embodiment which may feature a fixed upper winch plate mount 1320. A fixed upper winch plate mount has advantages over the prior art in saving expense in the production of the system without sacrificing quality. The fixed upper winch plate mount is in fixed attachment to the main body 200 and in fixed attachment to the broad winch plate 1350. Thus, there are fewer moving parts, allowing for a lower cost of production and less complication in making ready for use. A broad winch plate may feature a pari of lower guards 1360 or support brackets to prevent fouling or unintentional access to rob secured by the lower cleats 1370.

Figure 20C:
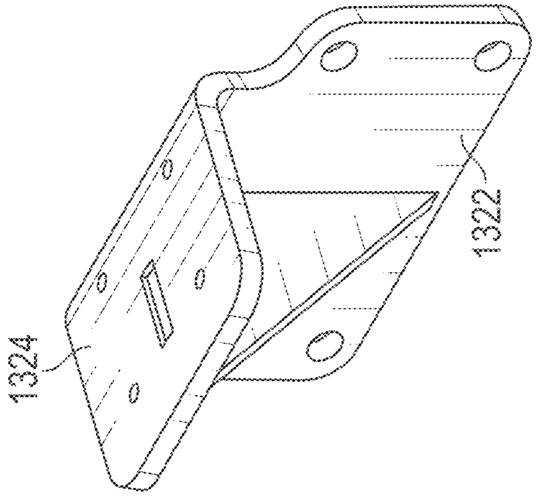
FIG. 20C is a perspective view of a fixed upper winch plate mount
Figure 20B:
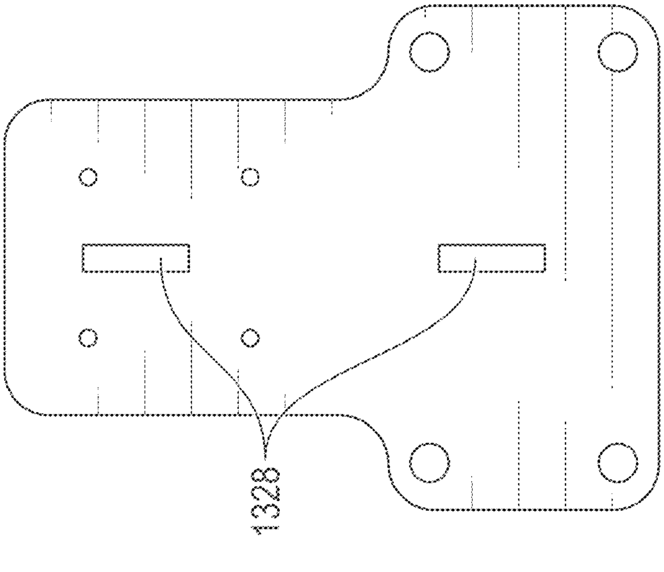
FIG. 20B is a plan view of a flattened fixed upper winch plate mount
Figure 20A:
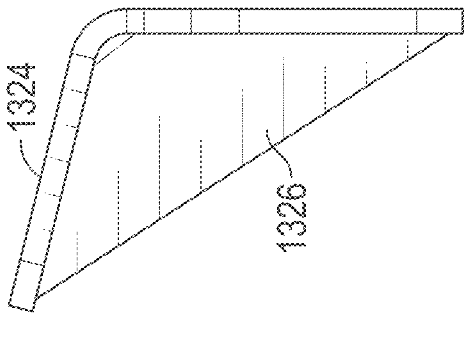
FIG. 20A is a side view of a fixed upper winch plate mount
Figure 21D:
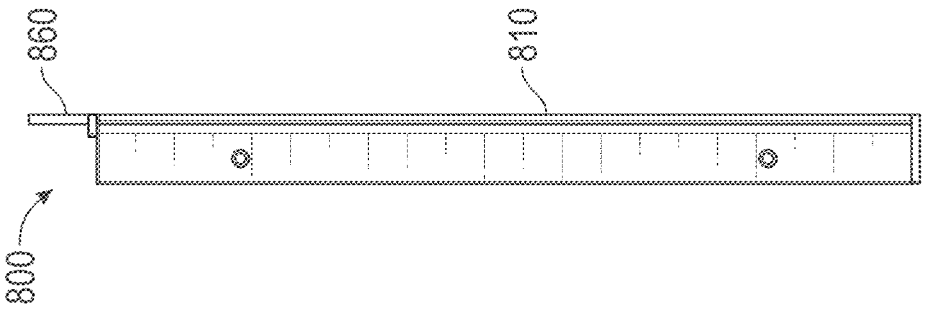
FIG. 21D is a left-side view of a flat mount system or davit flat mount assembly
Figure 21C:
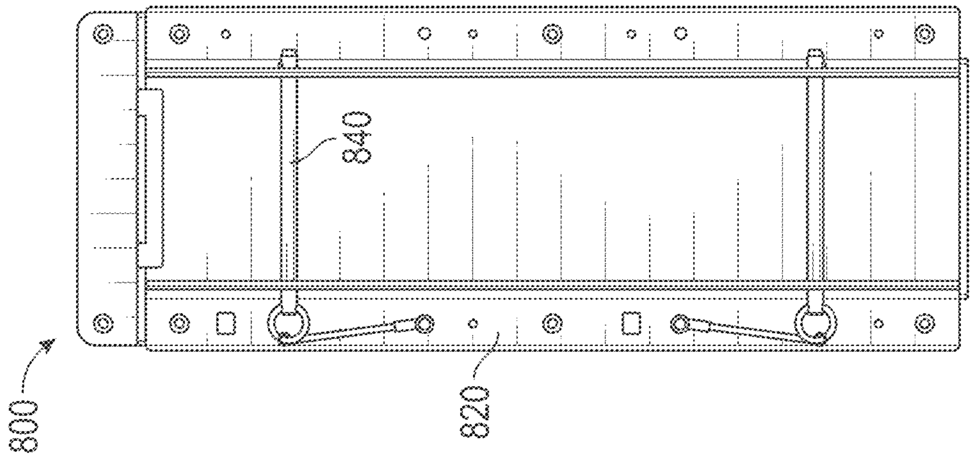
FIG. 21C is a front view of a flat mount system or davit flat mount assembly
Figure 21B:
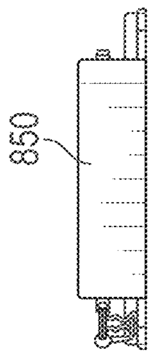
FIG. 21B is a bottom view of a flat mount system or davit flat mount assembly
Figure 21A:
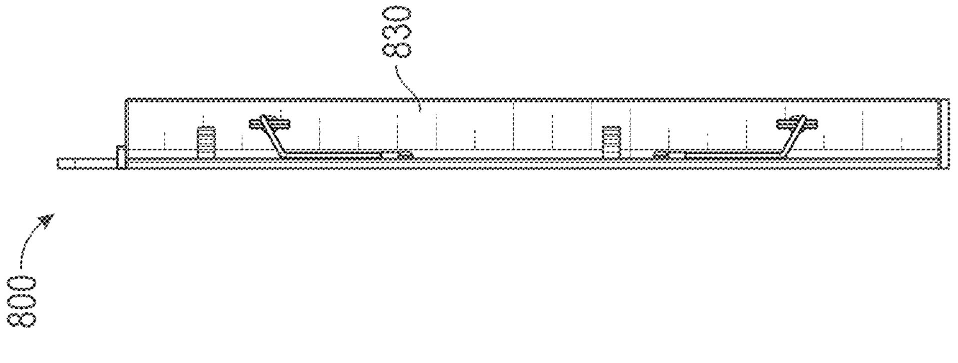
FIG. 21A is a right-side view of a flat mount system or davit flat mount assembly
Figure 21G:
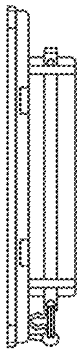
FIG. 21G is a top elevation view of a flat mount system or davit flat mount assembly
Figure 21F:
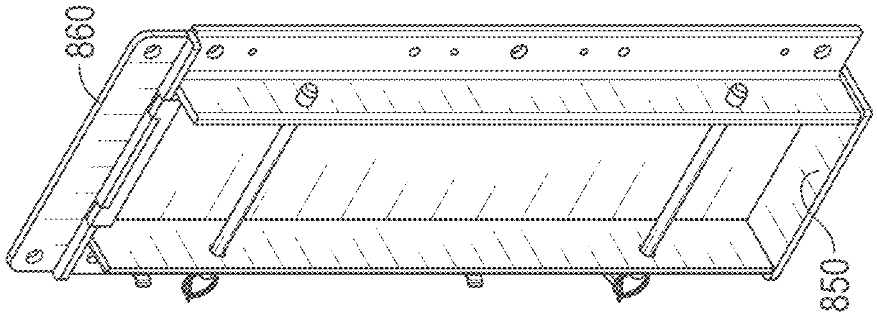
FIG. 21F is a perspective view of a flat mount system or davit flat mount assembly
Figure 21E:
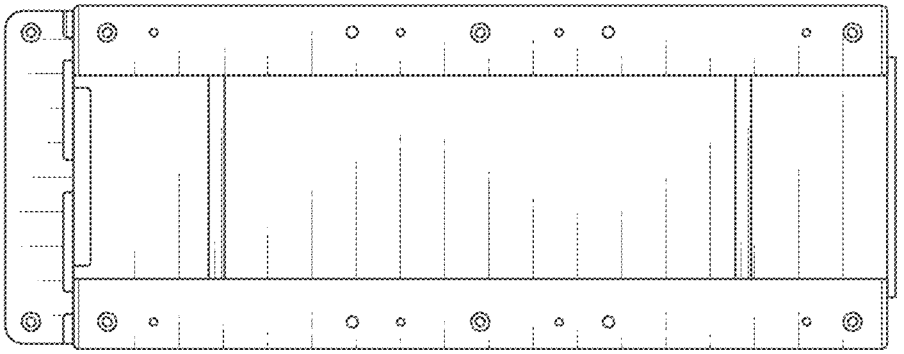
FIG. 21E is a back view of a flat mount system or davit flat mount assembly
Figure 22:
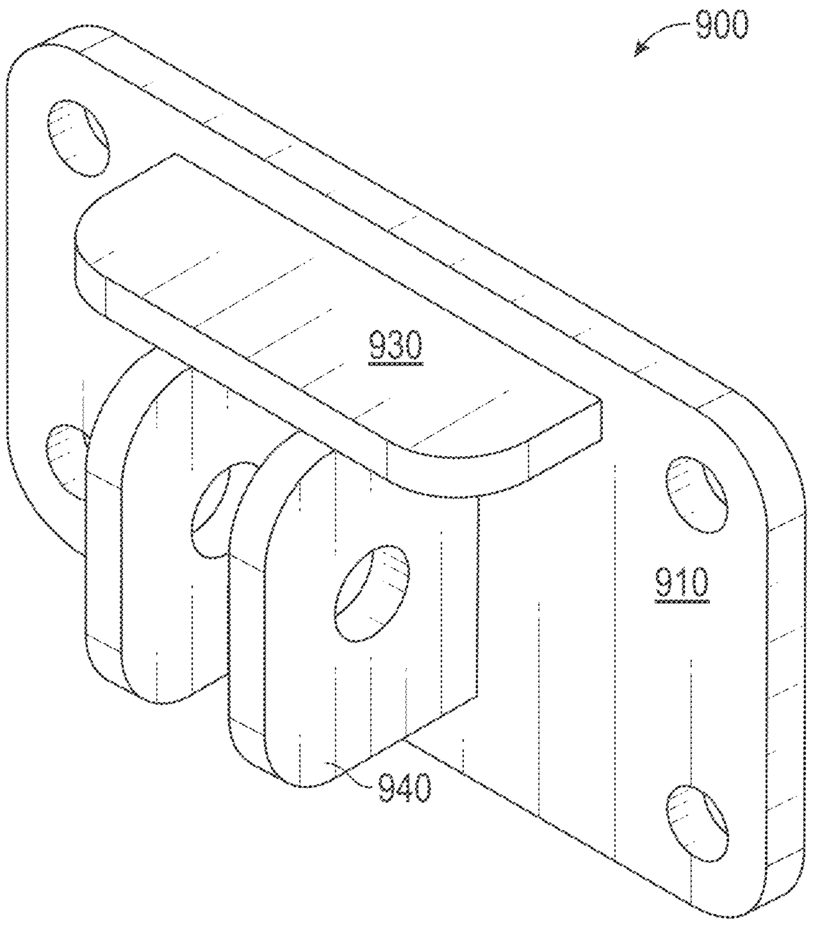
FIG. 22 is a front and side perspective view of lower boom mount or lower davit mount

FIGS. 20A to 20C show features of the fixed upper winch plate mount.

FIGS. 21A to 21G show features of the flat mount system or davit flat mount 800. The flat mount system overcomes shortfalls in the related art by eschewing the prior art's penchant for bitt mounting. A flat mount system may be mounted upon a ship or dock and then used for direct attachment to any of the disclosed davit systems. This system saves space and provides a simple and secure method of attachment with a very low profile.

Figure 23:
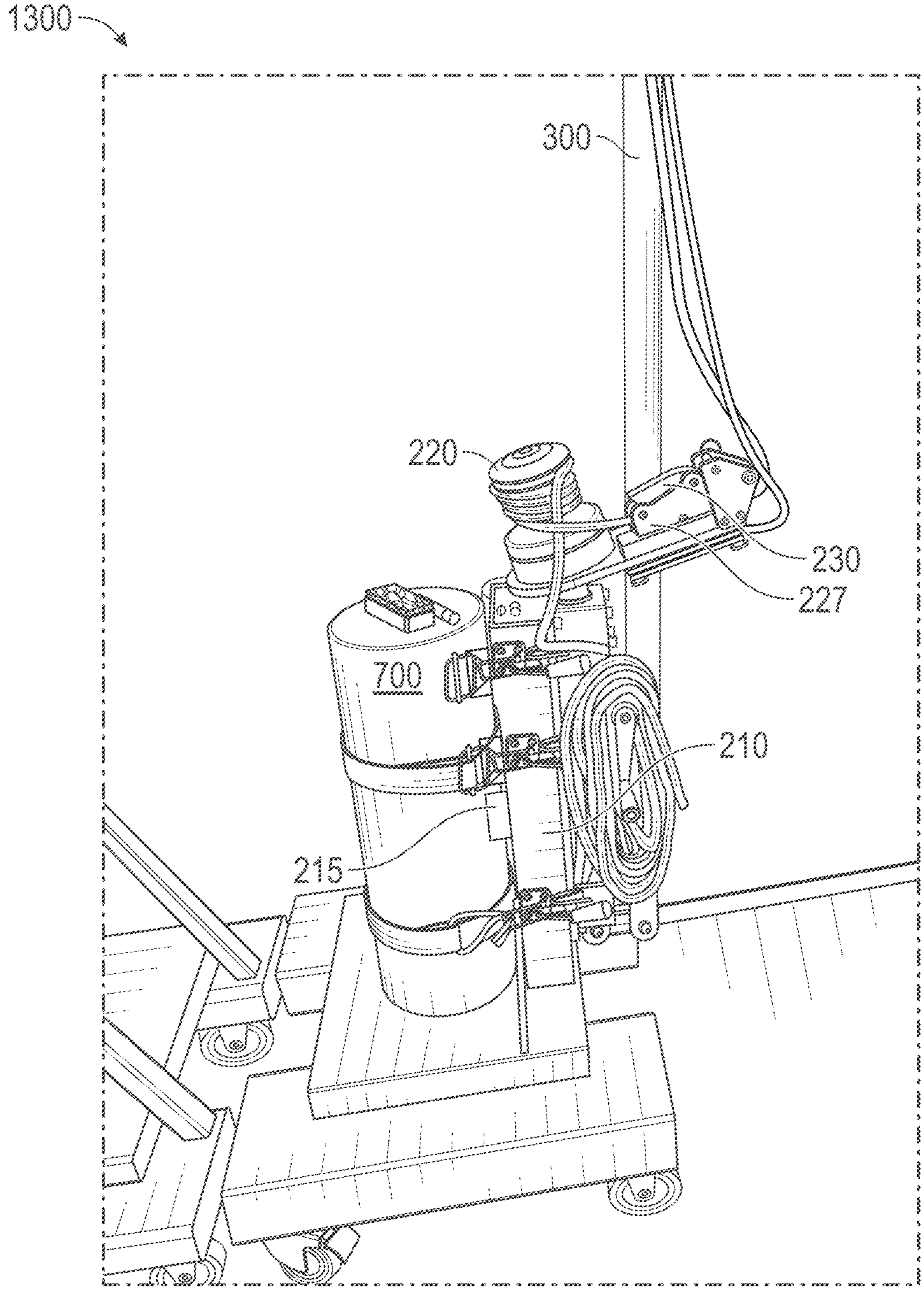
FIG. 23 is a side perspective view of a series 3 embodiment attached to a bitt

FIG. 23 depicts a series 3 system attached to bitt.

Figure 24:
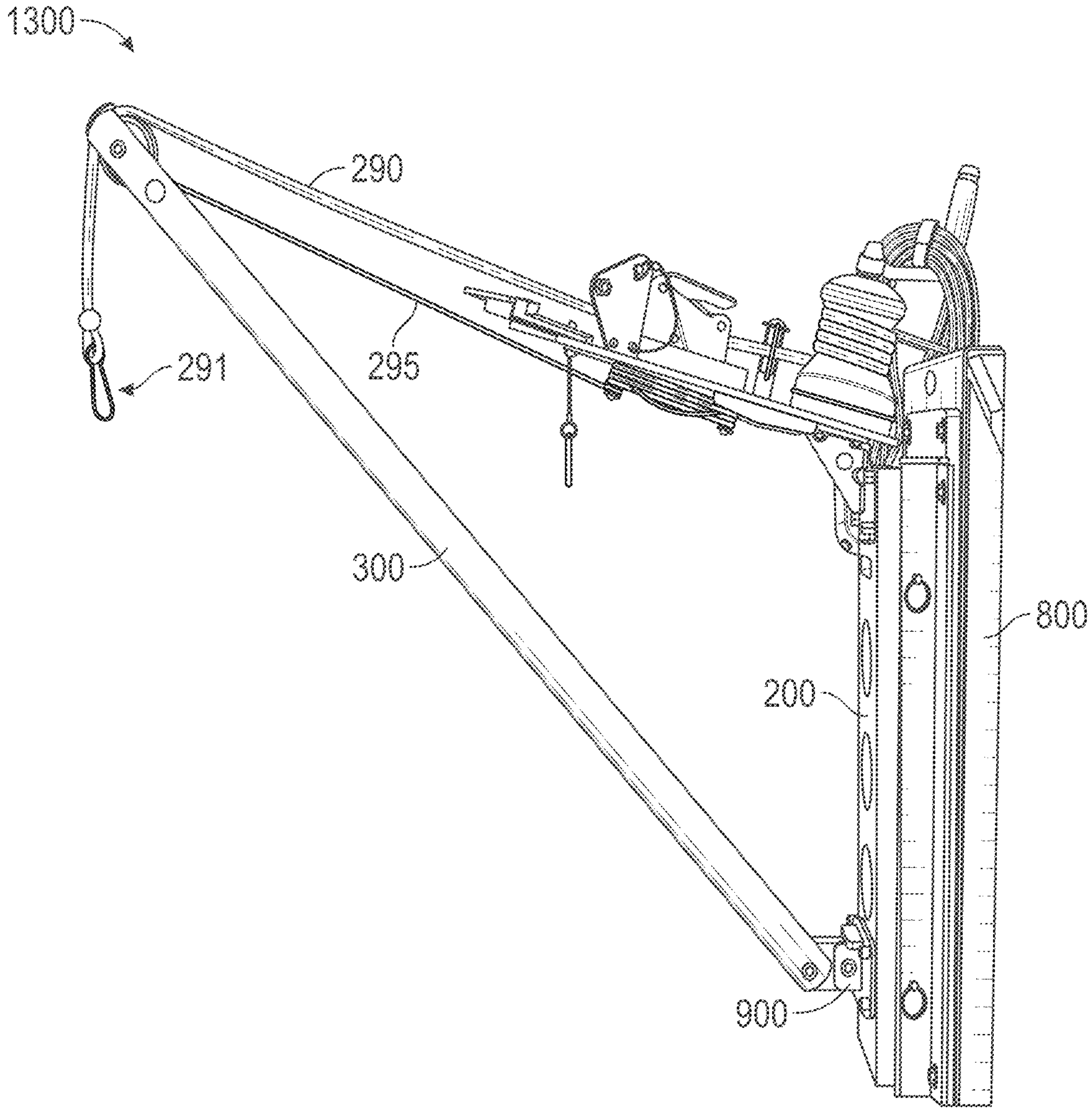
FIG. 24 is a side perspective view of a series 3 embodiment attached to a flat mount system or davit flat mount

FIG. 24 depicts a series 3 system 1300 attached to a flat mount system 800.

Figure 25:
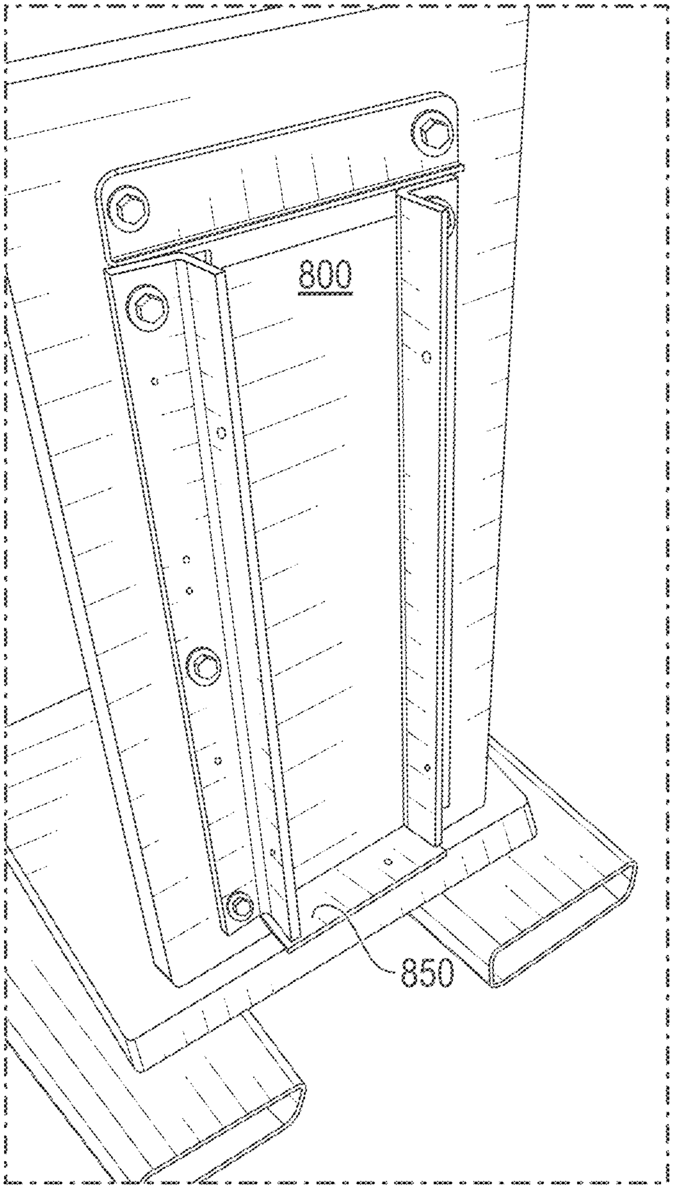
FIG. 25 is a front and side perspective view of a flat mount system or davit flat mount

FIG. 25 depicts a flat mount system 800 ready to receive a davit system.

Figure 26:
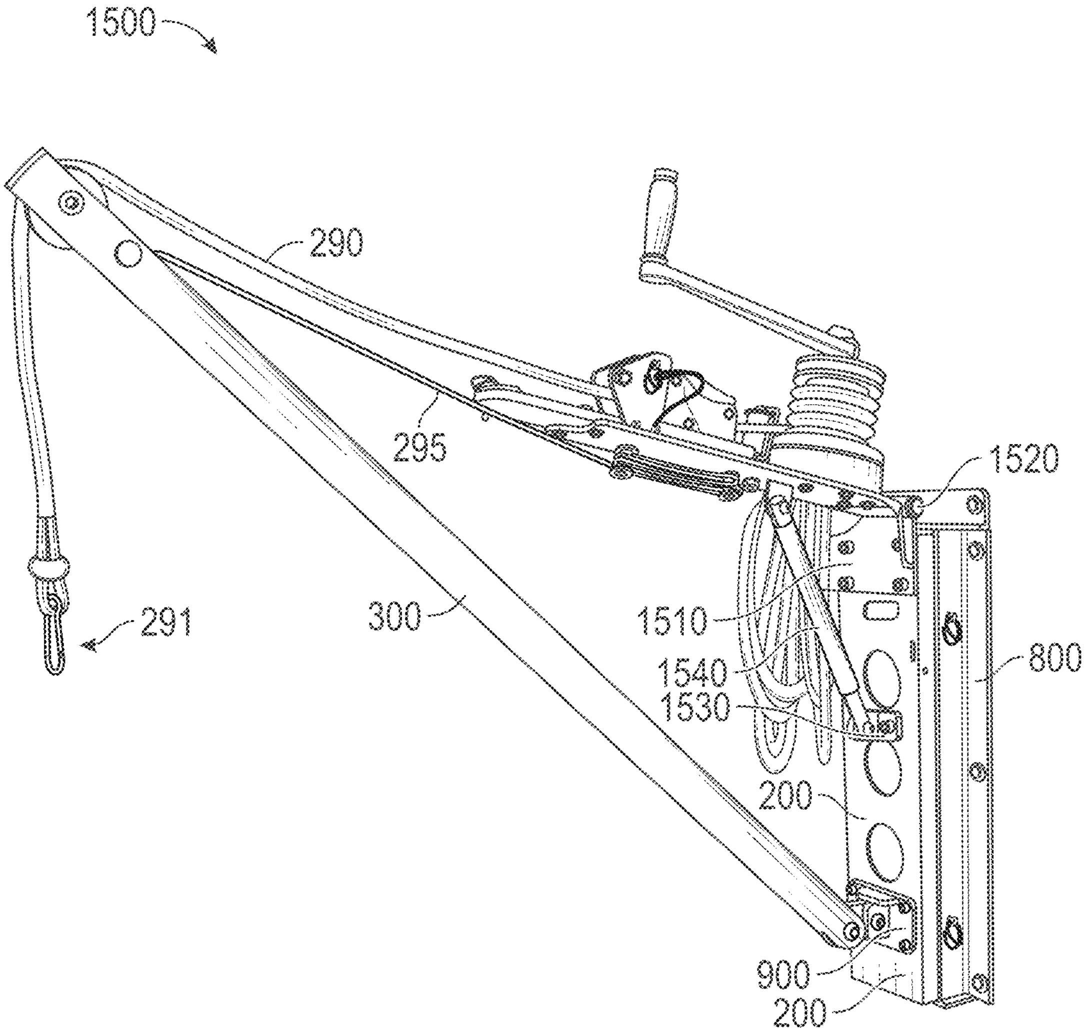
FIG. 26 is a side perspective view of a series 5 embodiment in an extended position

FIG. 26 depicts a series 5 system 1500 having a hinge plate 1510, hinge 1530 with the hinge connected to a pivoting winch plate. The winch plate may be in pivotal connection to s strut 1540 at the struts top end. The strut may have a lower end in pivotal connection to a lower shock mount 1530, the lower shock mount in fixed connection to the main body 200.

Figure 27:
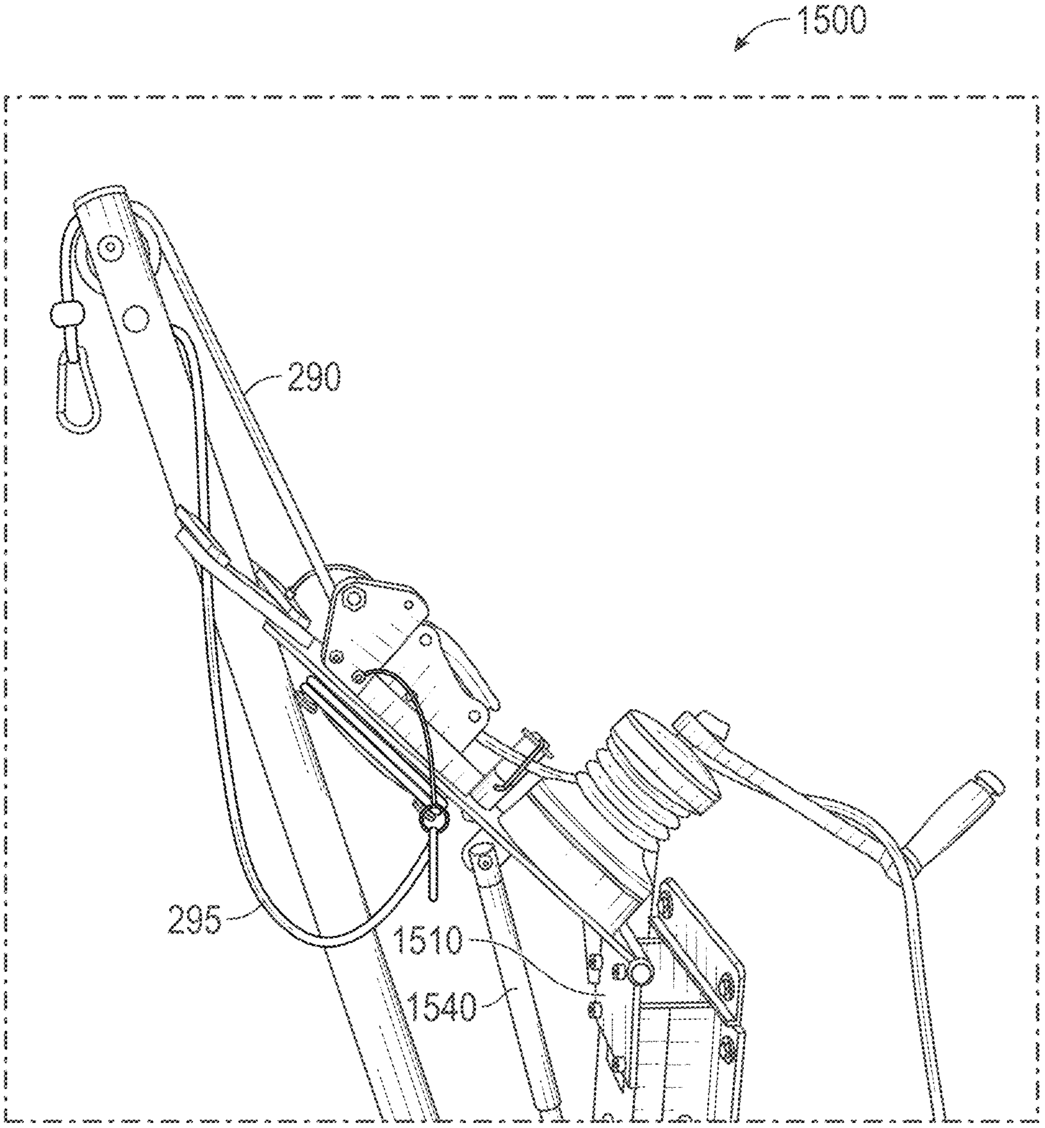
FIG. 27 is a side perspective view of a series 5 embodiment in an retracted position
Figure 28C:
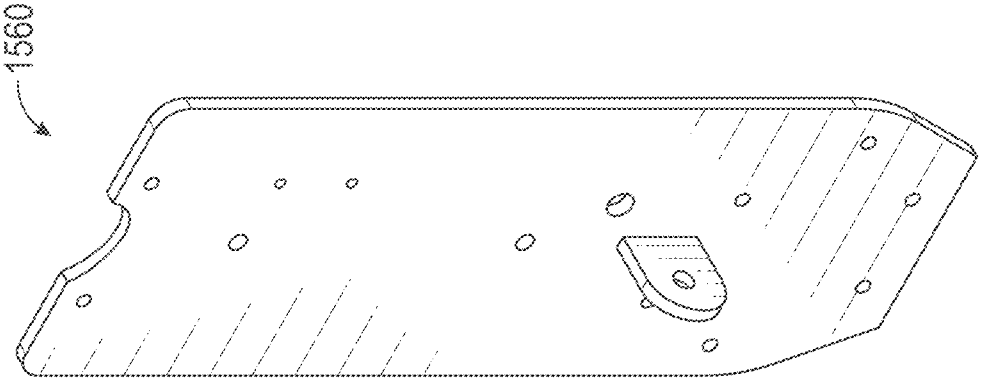
FIG. 28C is perspective view of a rectangular winch plate
Figure 28B:
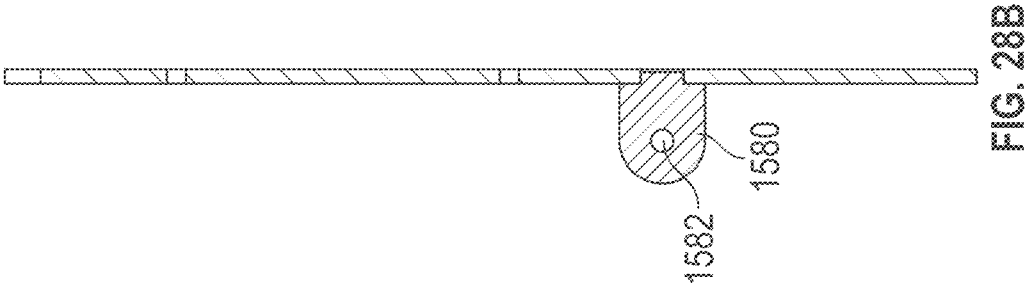
FIG. 28B is a side view of a rectangular winch plate
Figure 28A:
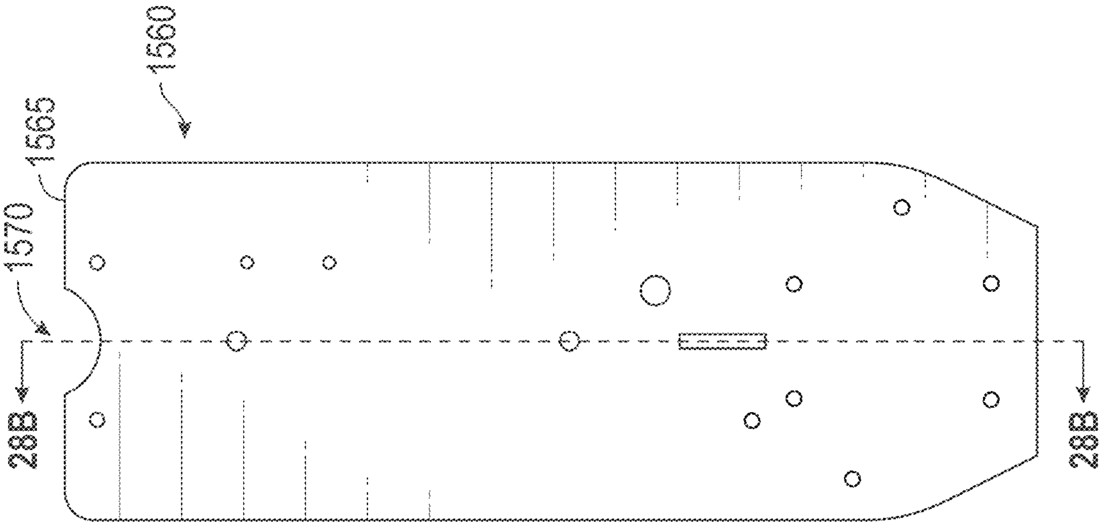
FIG. 28A is a top plan view of a rectangular winch plate
Figure 29:
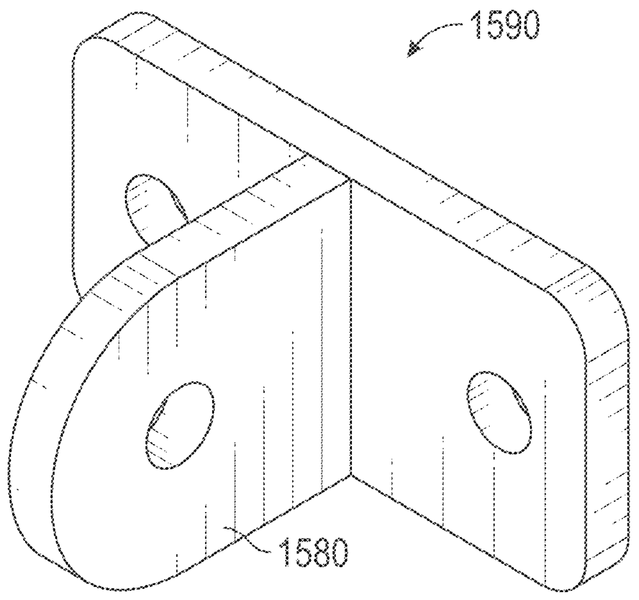
FIG. 29 is a perspective view of a winch plate strut mount
Figure 30:
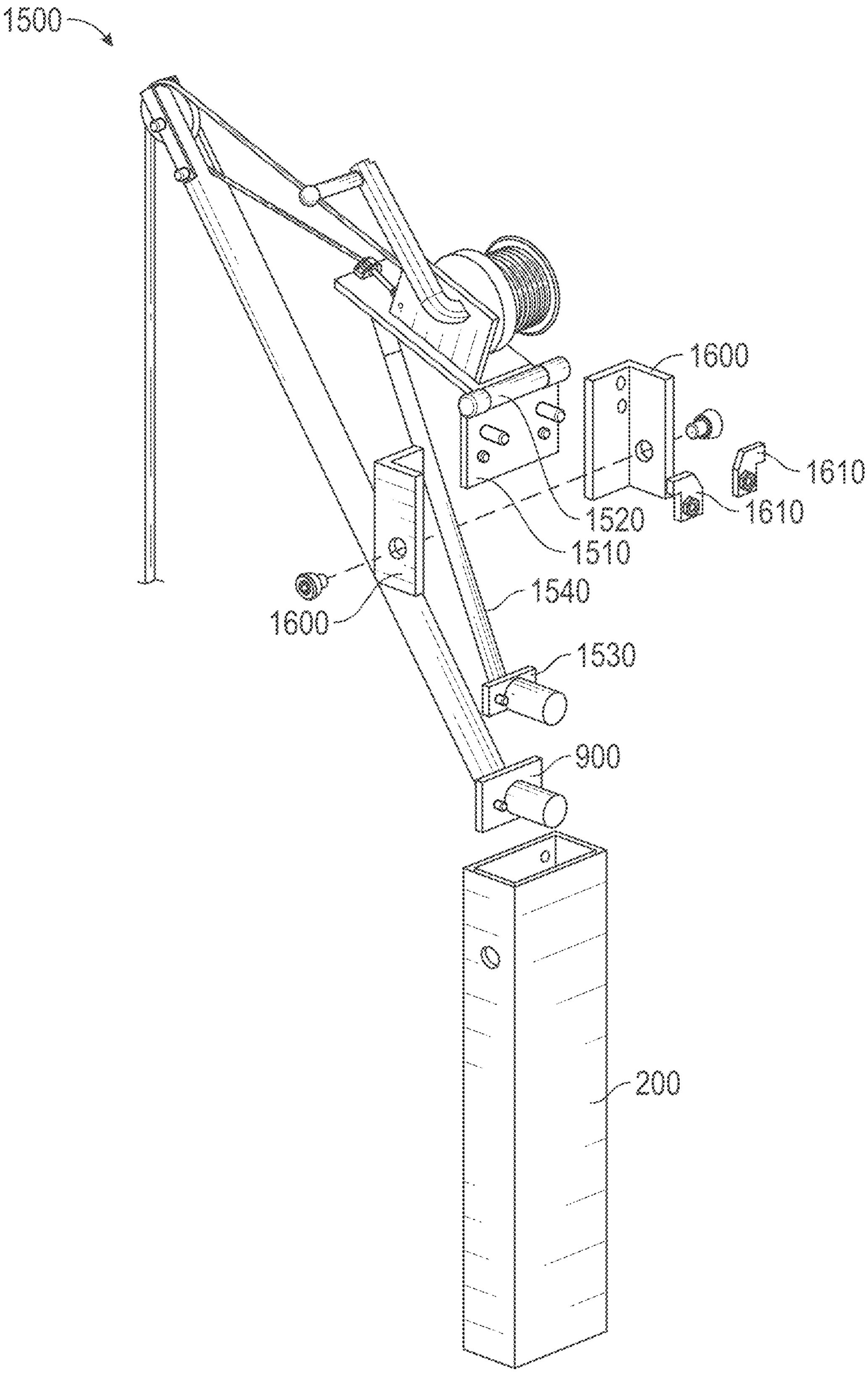
FIG. 30 is an exploded view of a series 5 embodiment
Figure 31:
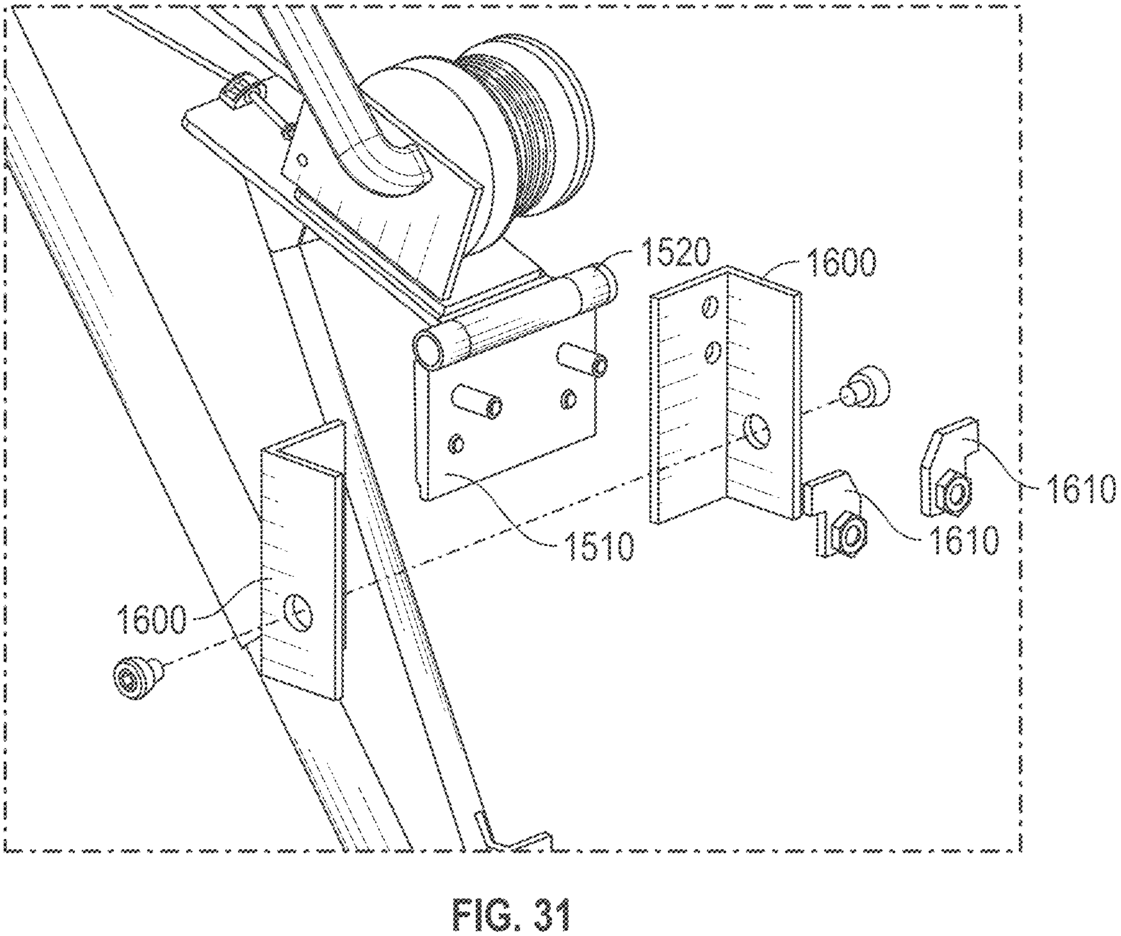
FIG. 31 is an exploded view of a series 5 embodiment
Figure 32:
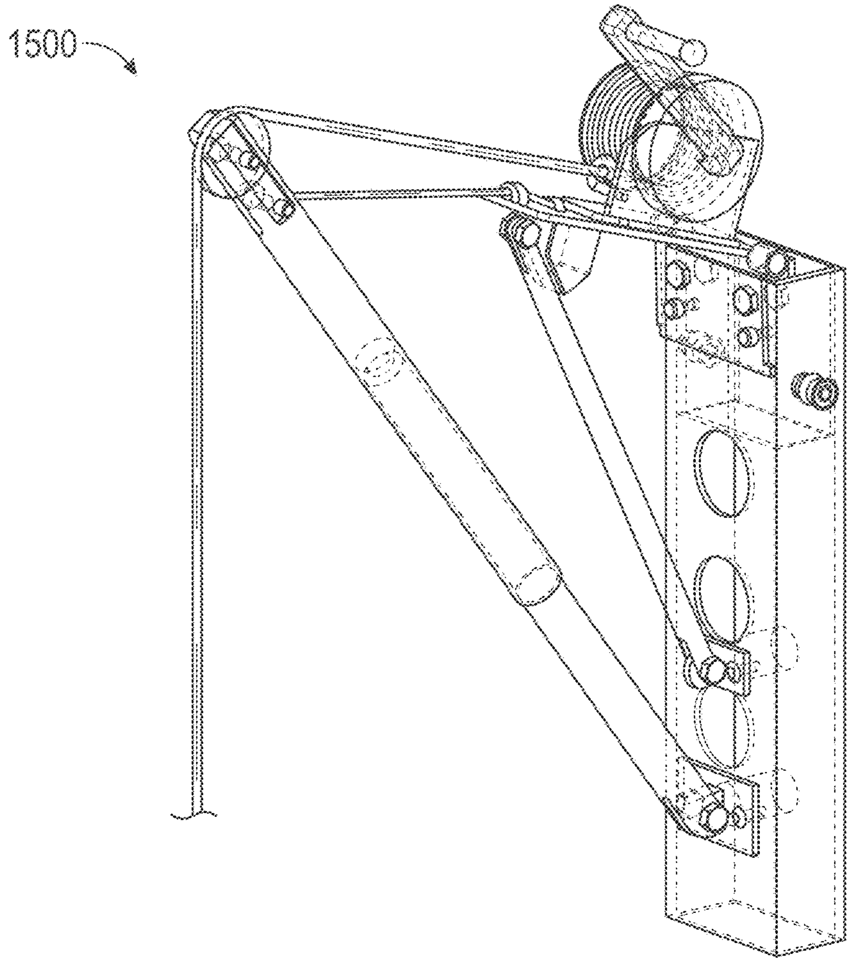
FIG. 32 is a sectional view of a series 5 embodiment
Figure 33:
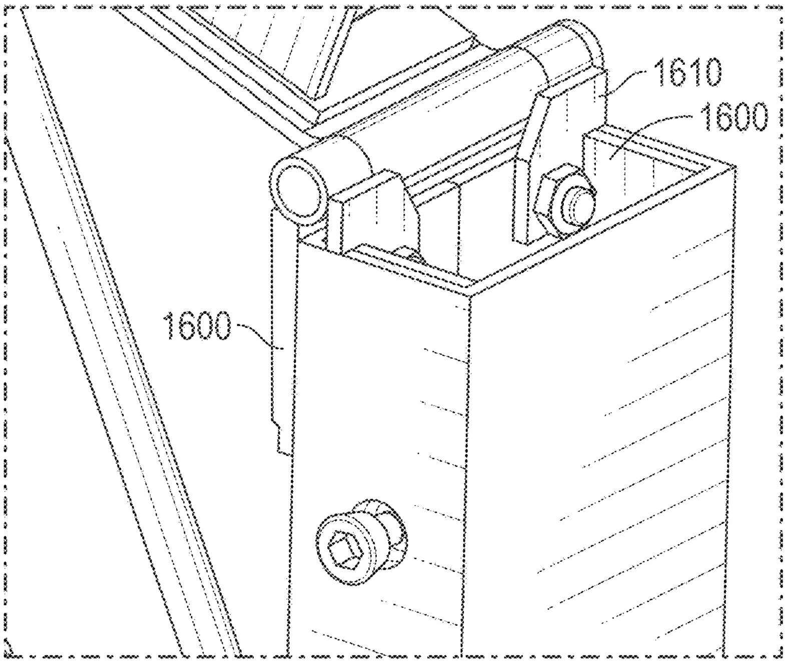
FIG. 33 is a perspective view of series 5 components
Figure 34:
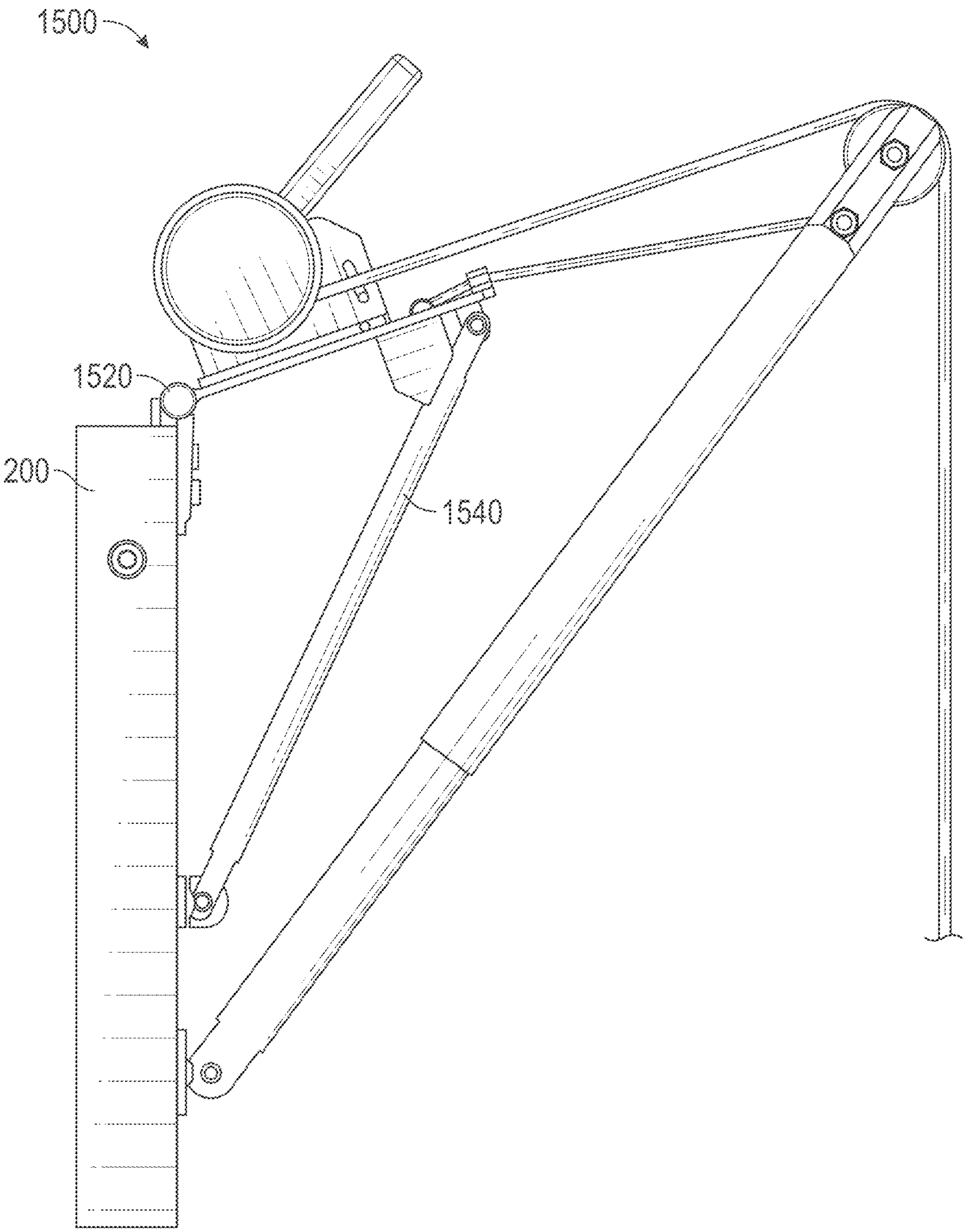
FIG. 34 is a side view of a series 5 embodiment
Figure 35:
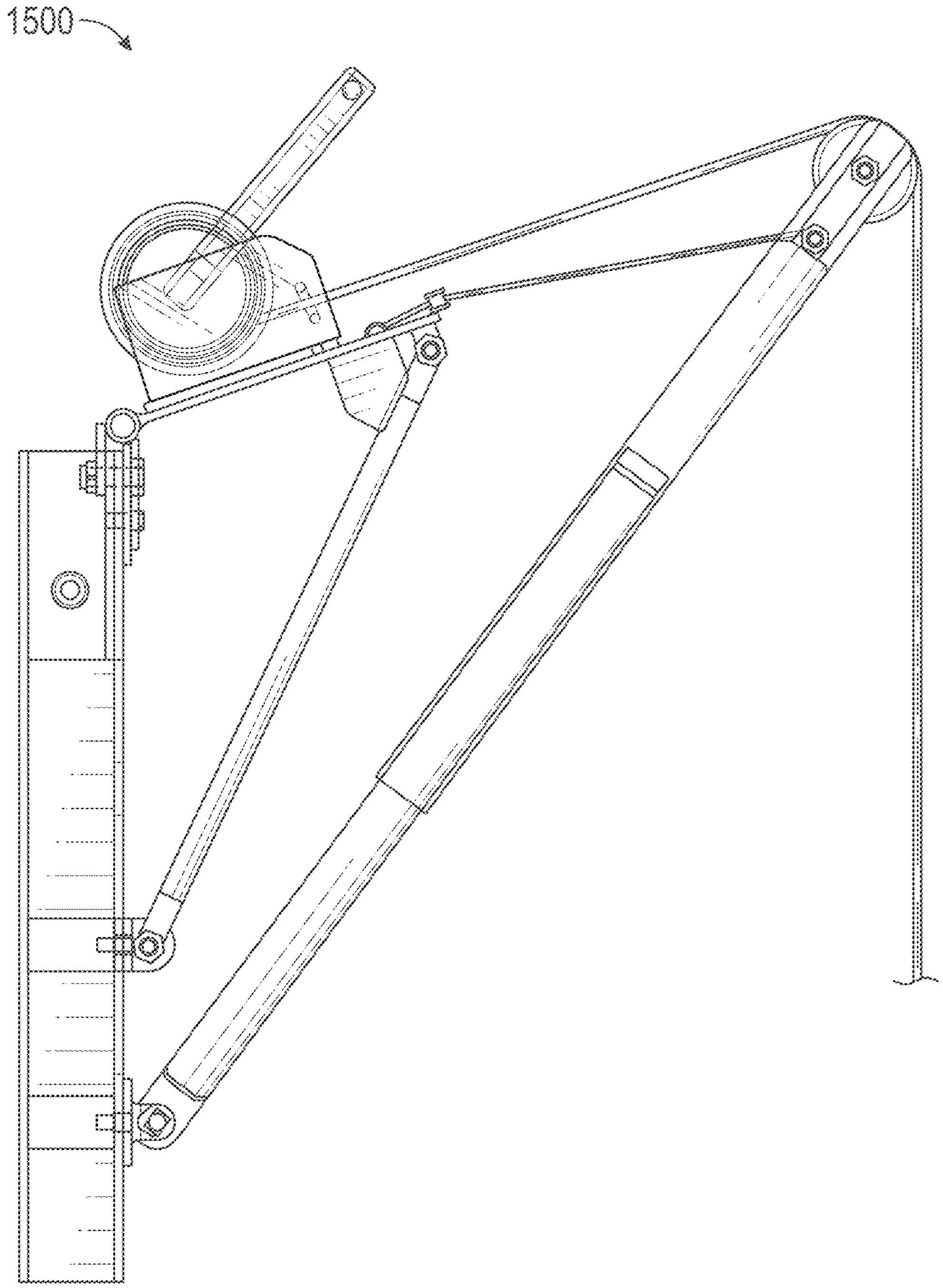
FIG. 35 is a sectional side view of a series embodiment

FIG. 27 depicts a series 5 system 1500 in a contracted position.

FIGS. 28A to 28C and FIG. 29 demonstrate a method of attachment between a rectangular winch plate 1560 and a struct bracket 1580.

FIGS. 30 to 35 demonstrate various components of a series 5 system and various means of component attachment.

Figure 36:
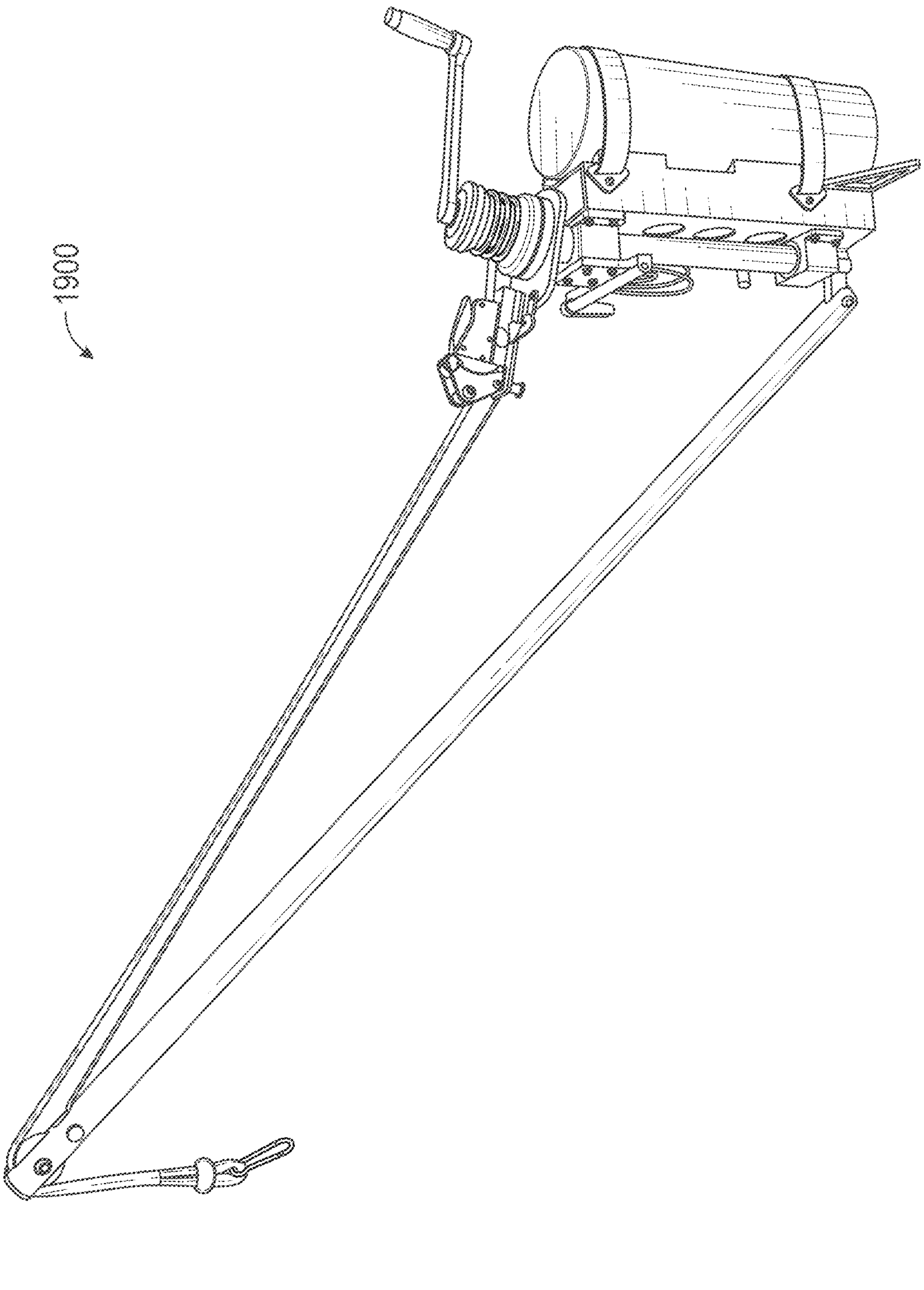
FIG. 36 is a perspective view of a series 7 embodiment

FIG. 36 depicts series 7 embodiment.

Figure 38:
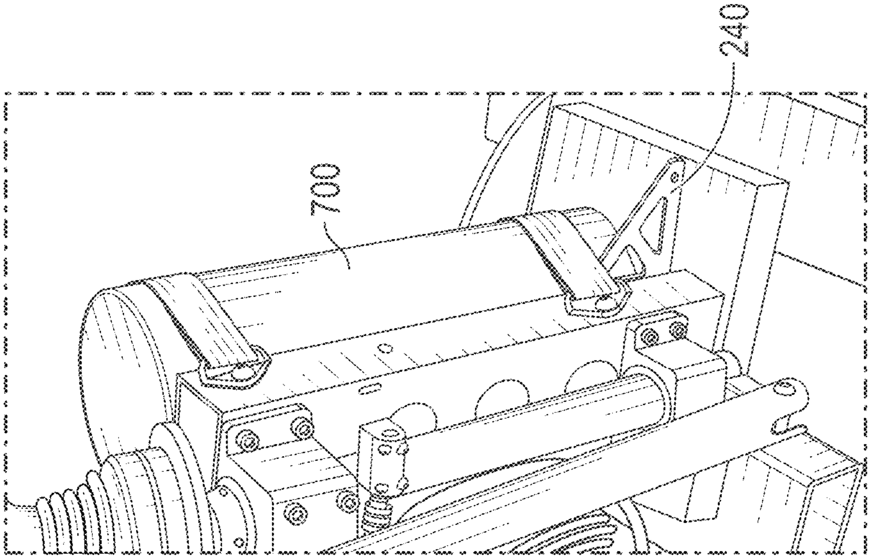
FIG. 38 is a perspective view of a series 7 embodiment
Figure 37:
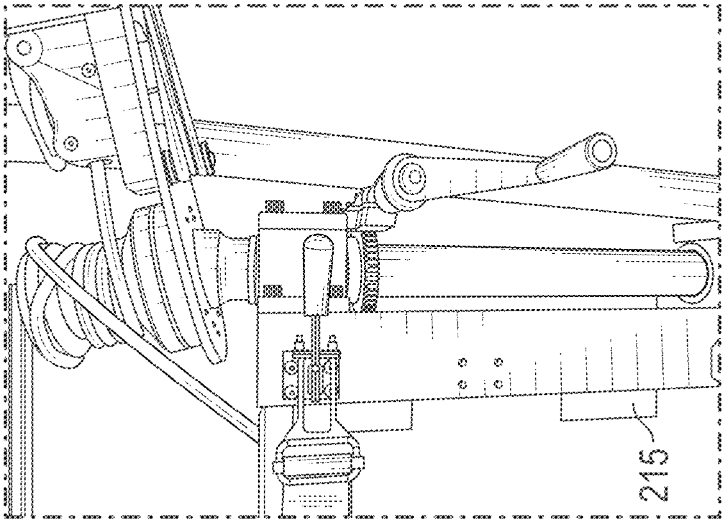
FIG. 37 is a perspective view of a series 7 embodiment

FIGS. 37 and 38 depict various components of a series 7 embodiment.

Figure 39:
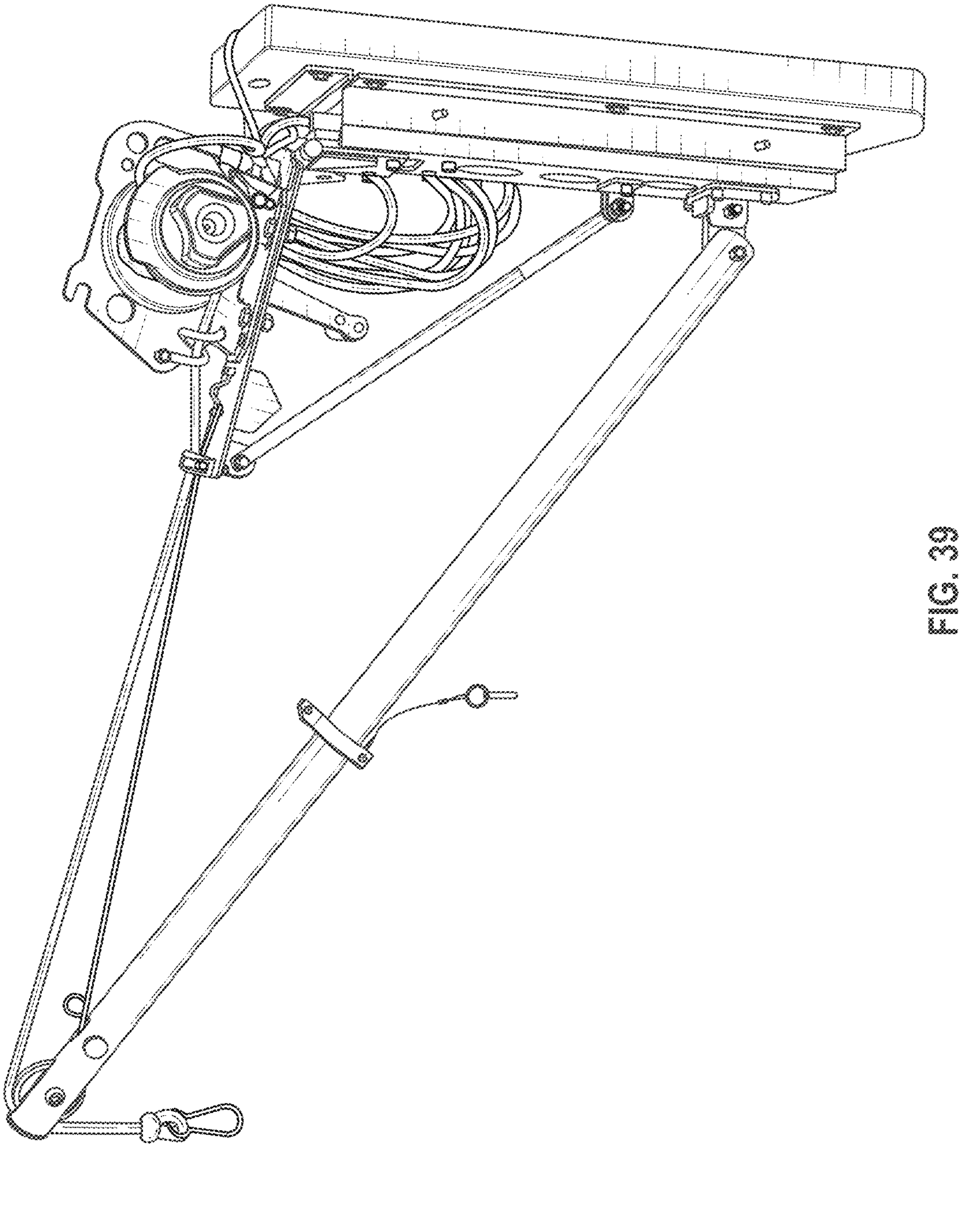
FIG. 39 is a perspective view of a series 9 embodiment
Figure 40:
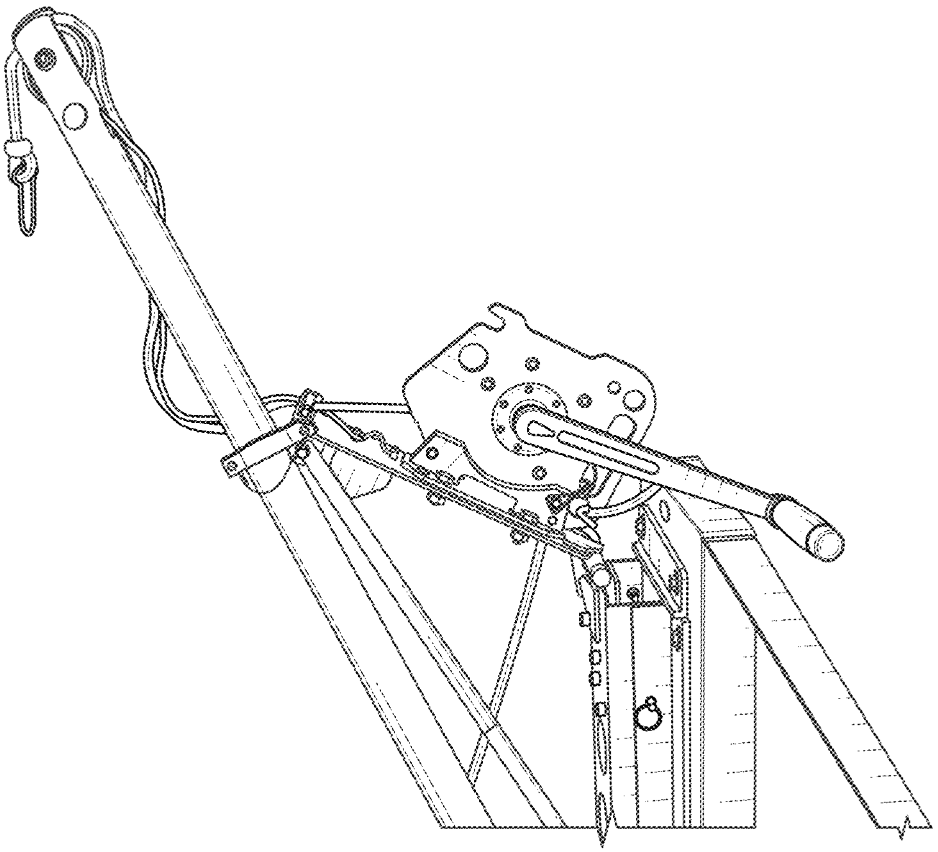
FIG. 40 is a perspective view of a series 9 embodiment
Figure 41:
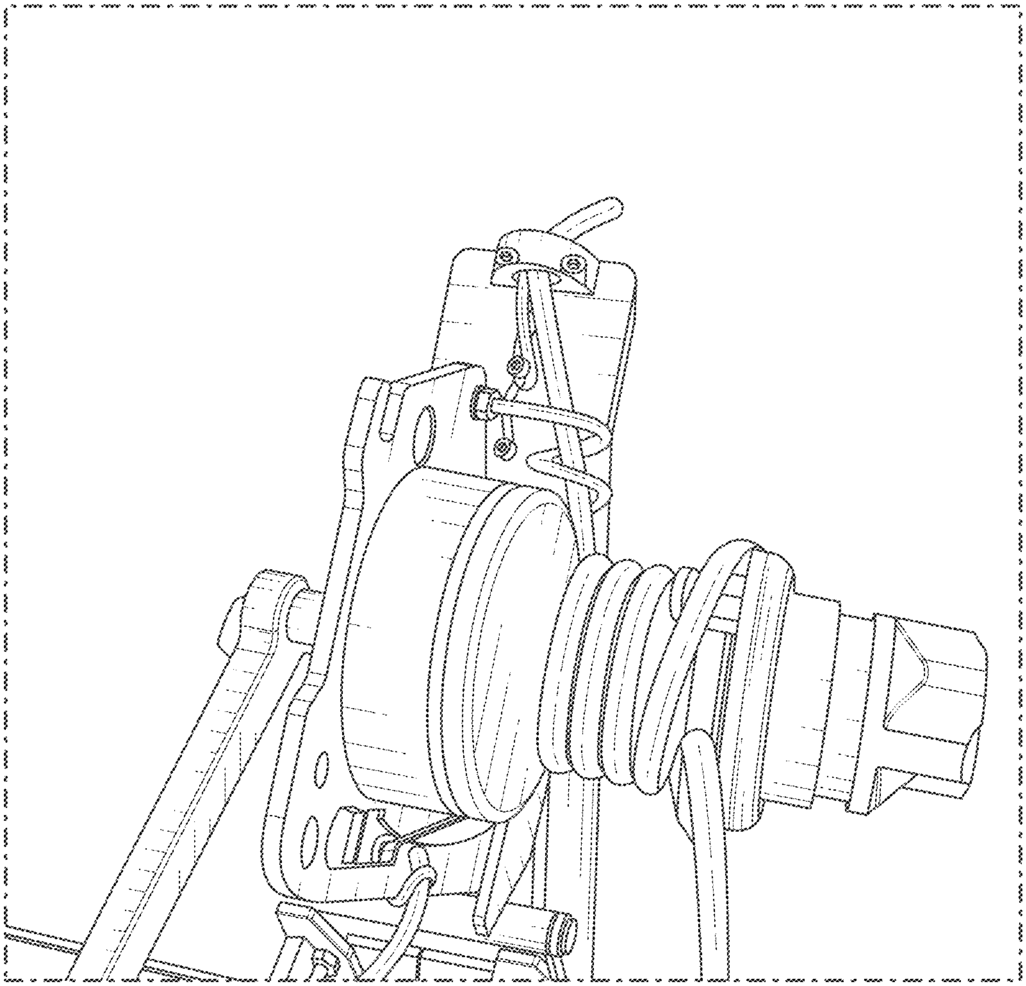
FIG. 41 is a perspective view of a series 9 embodiment

FIGS. 39, 40 and 41 depict various components of a series 9 embodiment shown as reference number 200.

Disclosed embodiments may include:

1. A man over board rescue system comprising:
   a) a main body (200), the main body having an upper front end attached to a vertical section (1322) of an fixed upper winch plate mount (1320), the fixed upper winch plate mount further comprising an angled horizontal section (1324)
   b) the angled horizontal section of the fixed upper winch plate attached to a broad winch plate (1350) and the broad winch plate attached to a winch (220); a rope clutch also attached to the broad winch plate;
   c) a tension line (295) attached to the broad winch plate and attached a distal end of a davit;
   d) the davit having a proximal end in pivotal attachment to a lower boom mount (900) the lower boom mount in fixed attachment to the main body.
2. The man over board rescue system of 1 further comprising:
   a) a lift line having a proximal end attached to the winch and the lift line having a distal end passing over a distal end of the davit.
3. The man over board rescue system of 1 further comprising:
   a) the main body in fixed attachment to a flat mount system (800)
4. A man over board rescue system of 1 wherein the main body is attached to a bitt.

5. A man over board rescue system comprising:

a) a main body (200) the main body having an upper front end in fixed attached to a hinge plate (1510) the hinge plate having an upper end in pivotal attachment to a broad winch plate (1350);

b) the broad winch plate attached to a winch (220) and the broad winch plate also attached to a rope clutch;

c) the broad winch plate having a lower side in pivotal connection to an upper end of a strut (1540) the strut having a lower end in pivotal connection to the main body; and d) the broad winch plate attached to a davit by use of tension line (295).

6. The man over board system of 5 further comprising:

a) A lift line having a proximal end attached to the winch and the lift line having a distal end passing over a distal end of the davit.

7. The man over board system of 5 further comprising:

a) the main body in fixed attachment to a flat mount system (800)

8. The man over board system of 5 further comprising:

a) the main body in fixed attachment to a bitt.

What is claimed is:

1. A man over board rescue system comprising:

a) a main body (200), the main body having an upper front end attached to a vertical section (1322) of an fixed upper winch plate mount (1320), the fixed upper winch plate mount further comprising an angled horizontal section (1324);

b) the angled horizontal section of the fixed upper winch plate attached to a broad winch plate (1350) and the broad winch plate attached to a winch (220); a rope clutch also attached to the broad winch plate;

c) a tension line (295) attached to the broad winch plate and attached a distal end of a davit;

d) the davit having a proximal end in pivotal attachment to a lower boom mount (900) the lower boom mount in fixed attachment to the main body.

2. The man over board rescue system of claim 1 further comprising:

a) a lift line having a proximal end attached to the winch and the lift line having a distal end passing over a distal end of the davit.

3. The man over board rescue system of claim 1 further comprising:

a) the main body in fixed attachment to a flat mount system (800).

4. A man over board rescue system of claim 1 wherein the main body is attached to a bitt.

5. A man over board rescue system comprising:

a) a main body (200) the main body having an upper front end in fixed attached to a hinge plate (1510) the hinge plate having an upper end in pivotal attachment to a broad winch plate (1350);

b) the broad winch plate attached to a winch (220) and the broad winch plate also attached to a rope clutch;

c) the broad winch plate having a lower side in pivotal connection to an upper end of a strut (1540) the strut having a lower end in pivotal connection to the main body; and d) the broad winch plate attached to a davit by use of tension line (295).

6. The man over board system of claim 5 further comprising:

a) A lift line having a proximal end attached to the winch and the lift line having a distal end passing over a distal end of the davit.

7. The man over board system of claim 5 further comprising:

a) the main body in fixed attachment to a flat mount system (800).

8. The man over board system of claim 5 further comprising:

a) the main body in fixed attachment to a bitt.

* * * * *